US009166799B2

(12) United States Patent
Kim

(10) Patent No.: US 9,166,799 B2
(45) Date of Patent: Oct. 20, 2015

(54) IMS SECURITY FOR FEMTOCELLS

(75) Inventor: Woojune Kim, Arlington, MA (US)

(73) Assignee: Airvana LP, Chelmsford, MA (US)

( * ) Notice: Subject to any disclaimer, the term of this patent is extended or adjusted under 35 U.S.C. 154(b) by 1092 days.

(21) Appl. No.: 11/968,088

(22) Filed: Dec. 31, 2007

(65) Prior Publication Data

US 2009/0172397 A1 Jul. 2, 2009

(51) Int. Cl.
*H04L 9/32* (2006.01)
*H04W 12/06* (2009.01)
*H04L 9/08* (2006.01)
*H04L 29/06* (2006.01)
*H04W 12/04* (2009.01)

(52) U.S. Cl.
CPC ............ *H04L 9/3273* (2013.01); *H04L 9/0844* (2013.01); *H04L 63/0853* (2013.01); *H04W 12/06* (2013.01); *H04L 63/062* (2013.01); *H04L 2209/80* (2013.01); *H04L 2463/061* (2013.01); *H04W 12/04* (2013.01)

(58) Field of Classification Search
CPC . H04L 9/3273; H04L 9/0844; H04L 63/0853; H04W 12/06
USPC .......................................... 713/166–169, 171
See application file for complete search history.

(56) References Cited

U.S. PATENT DOCUMENTS

| | | | | |
|---|---|---|---|---|
| 6,201,871 B1* | 3/2001 | Bostley, III et al. | .......... | 380/249 |
| 6,788,676 B2* | 9/2004 | Partanen et al. | .............. | 370/352 |
| 7,546,459 B2* | 6/2009 | Robles et al. | ................. | 713/168 |
| 7,613,299 B2* | 11/2009 | Carroll | .......................... | 380/248 |
| 7,707,412 B2* | 4/2010 | Nyberg et al. | ................ | 713/168 |
| 8,230,035 B2* | 7/2012 | Morgan et al. | ................ | 709/213 |
| 8,428,554 B2* | 4/2013 | Morgan et al. | ................ | 455/410 |
| 8,457,597 B2* | 6/2013 | Morgan et al. | ................ | 455/410 |
| 8,787,308 B2* | 7/2014 | Yee | ............................. | 370/331 |
| 2003/0233546 A1* | 12/2003 | Blom | ........................... | 713/168 |
| 2005/0210251 A1* | 9/2005 | Nyberg et al. | ................ | 713/169 |
| 2005/0278420 A1* | 12/2005 | Hartikainen et al. | ......... | 709/203 |
| 2007/0043947 A1* | 2/2007 | Mizikovsky et al. | ......... | 713/172 |
| 2007/0157022 A1* | 7/2007 | Blom et al. | ................... | 713/166 |
| 2008/0162637 A1* | 7/2008 | Adamczyk et al. | ........... | 709/204 |

(Continued)

OTHER PUBLICATIONS

Technical Specification: 3rd Generation Partnership Project 2 ("3GPP2"), *CAVE-Based-2G IMS Security*, dated Mar. 2007, 11 pages.

(Continued)

*Primary Examiner* — Thu Ha Nguyen
(74) *Attorney, Agent, or Firm* — Fish & Richardson P.C.

(57) ABSTRACT

A mobile station can be authenticated by, for example, sending a challenge to a mobile station, and receiving a first authentication response from the mobile station through a wireless link, the first authentication response being generated based on the challenge and an authentication key stored at the mobile station. A second authentication response is generated based on the first authentication response. The second authentication response is provided to an IMS network for authenticating the mobile station to enable the mobile station to access the IMS network. In some examples, an authentication response of the mobile station is carried in an SIP message sent from the femtocell to a server that can authenticate the mobile station or forward the authentication response to another server that can authenticate the mobile station. Authentication of the mobile station can be performed as an integrated part of or separate from a registration process.

29 Claims, 13 Drawing Sheets

(56) References Cited

U.S. PATENT DOCUMENTS

| | | | |
|---|---|---|---|
| 2009/0067417 A1* | 3/2009 | Kalavade et al. | 370/356 |
| 2009/0089583 A1 | 4/2009 | Patel | 713/171 |
| 2009/0094683 A1* | 4/2009 | Morgan et al. | 726/4 |
| 2009/0172397 A1* | 7/2009 | Kim | 713/168 |
| 2009/0191844 A1* | 7/2009 | Morgan et al. | 455/411 |
| 2009/0220091 A1* | 9/2009 | Howard | 380/277 |
| 2009/0227234 A1* | 9/2009 | Bosch et al. | 455/411 |
| 2010/0048174 A1* | 2/2010 | Osborn | 455/411 |
| 2011/0128913 A1* | 6/2011 | Chowdhury et al. | 370/328 |
| 2011/0263225 A1* | 10/2011 | Escott et al. | 455/411 |
| 2011/0269428 A1* | 11/2011 | Morgan et al. | 455/411 |
| 2012/0164981 A1* | 6/2012 | Pauliac | 455/411 |
| 2012/0184249 A1* | 7/2012 | Morgan et al. | 455/411 |
| 2012/0225640 A1* | 9/2012 | Bosch et al. | 455/410 |
| 2012/0254959 A1* | 10/2012 | Schmidt et al. | 726/6 |
| 2013/0275308 A1* | 10/2013 | Paraskeva et al. | 705/71 |
| 2013/0281060 A1* | 10/2013 | Escott et al. | 455/411 |
| 2014/0086177 A1* | 3/2014 | Adjakple et al. | 370/329 |
| 2014/0273949 A1* | 9/2014 | Duggan et al. | 455/410 |

OTHER PUBLICATIONS

Technical Specification: $3^{rd}$ Generation Partnership Project 2 ("3GPP2"), *IMS Security Framework,* dated Dec. 8, 2005, 43 pages.

* cited by examiner

IMS SECURITY FOR FEMTOCELLS

BACKGROUND

The description relates to Internet Protocol (IP) Multimedia Subsystem security for femtocells.

IP Multimedia Subsystem (IMS) security is defined by 3GPP2 S.S0086, IMS Security Framework, December 2005, standard, the contents of which are incorporated herein by reference. The S.S0086 standard specifies the use of a mutually authenticated authentication and key agreement (AKA) protocol to establish a security association between an IP multimedia user entity (ME) and a proxy call session control function (P-CSCF) module. In addition, a proposed standard S.P00127 [3GPP2 S.P00127-0] defines the use of a legacy removable user identity modules (R-UIM)—smart cards containing code division multiple access (CDMA) subscription information and supporting the second generation (2G) CDMA/IS-41 security scheme based on the cellular authentication and voice encryption (CAVE) algorithm.

SUMMARY

In general, in one aspect, a challenge is sent to a mobile station; and a first authentication response is received from the mobile station through a wireless link, the first authentication response being generated based on the challenge and an authentication key stored at the mobile station. A secret key is generated based on the first authentication response; a second authentication response is generated based on the secret key; and the second authentication response is provided to an IMS network for authenticating the mobile station to enable the mobile station to access the IMS network.

Implementations may include one or more of the following features. The secret key includes an AKA (authentication and key agreement) key. Generating a secret key includes generating the secret key based on the first authentication response and a random number. A cipher key (CK) and an integrity key (IK) are generated from the secret key. Generating the second authentication response includes generating the second authentication response according to, for example, hypertext transfer protocol (HTTP) digest authentication using authentication and key agreement (AKA). The mobile station is compatible with an authentication process based on, for example, CAVE (cellular authentication and voice encryption) algorithm. The mobile station generates a signaling message encryption key (SMEKEY) and a private long code mask (PLCM) internally but does not transmit the SMEKEY and PLCM wirelessly. The mobile station is not compatible with an authentication process based on AKA (authentication and key agreement) protocol. Sending a challenge to a mobile station includes sending, from a femtocell, the challenge to the mobile station. The challenge is derived from a random challenge provided by the IMS network.

In general, in another aspect, at an IMS network, an AKA key is generated based on a first authentication response (AUTHR); and a second authentication response is generated from the AKA key. A message having information about a random challenge is transmitted to a remote client. A third authentication response is received from the remote client, the third authentication response being derived based on a fourth authentication response sent by a mobile station wirelessly to the remote client, the fourth authentication response being derived based on the random challenge. The mobile station is authenticated based on a comparison of the second and third authentication responses.

Implementations may include one or more of the following features. Transmitting to a remote client includes transmitting to a femtocell. Generating a second authentication response includes generating the second authentication response by applying an AKA algorithm to the AKA key. The remote client does not support full IMS authentication. The remote client supports CAVE based authentication. A cipher key and an integrity key are generated based on the AKA key. The mobile station is compatible with an authentication process based on CAVE algorithm. The mobile station generates an authentication response (AUTHR), a signaling message encryption key (SMEKEY), and a private long code mask (PLCM) and transmits the AUTHR to the client device wirelessly but does not transmit the SMEKEY and PLCM to the client device. The mobile station is not compatible with an authentication process based on AKA (authentication and key agreement) protocol.

In general, in another aspect, in an IP multimedia subsystem (IMS) network, a first module generates an AKA (authentication and key agreement) key based on a first authentication response (AUTHR), and generates a second authentication response from the AKA key. A second module transmits a message to a remote client, the message having information about a random challenge, and receives a third authentication response from the remote client, the third authentication response being derived based on a fourth authentication response sent by a mobile station wirelessly to the remote client, the fourth authentication response being derived based on the random challenge. The second module authenticates the mobile station based on a comparison of the second and third authentication responses.

Implementations may include one or more of the following features. The remote client includes a femtocell. The first module includes a home subscriber server (HSS). The second module includes a call session control function (CSCF) module, which can include, for example, a proxy call session control function (P-CSCF) module or a serving call session control function (S-CSCF) module. The first module generates the second authentication response by applying an AKA algorithm to the AKA key. The first module recognizes that the remote client does not support full IMS authentication. The first module recognizes that the remote client supports CAVE (cellular authentication and voice encryption) based authentication. The first module generates a cipher key (CK) and an integrity key (IK) based on the AKA key. The mobile station is compatible with an authentication process based on CAVE (cellular authentication and voice encryption) algorithm. The mobile station generates an authentication response (AUTHR), a signaling message encryption key (SMEKEY), and a private long code mask (PLCM) and transmits the AUTHR to the client device wirelessly but does not transmit the SMEKEY and PLCM to the client device. The mobile station is not compatible with an authentication process based on AKA (authentication and key agreement) protocol.

In general, in another aspect, a femtocell is registered with a network using a session initiation protocol (SIP) authentication process; and a mobile station is authenticated by carrying the mobile station's authentication response and other information used to derive the response such as a random number in an SIP message sent from the femtocell to a server, in which the server is capable of authenticating the mobile station based on the authentication response or forwards the authentication response to another server that is capable of authenticating the mobile station.

Implementations may include one or more of the following features. A femtocell identifier is assigned to the mobile station. The femtocell identifier is associated with a mobile identification number (MIN) of the mobile station. Registering a femtocell with a network includes registering the femtocell with an IP multimedia subsystem (IMS) network. Registering the femtocell with the IMS network includes authenticating the femtocell using one of a plurality of generic IMS credentials pre-configured in the femtocell, and each of the generic IMS credentials can be used to authenticate the SIP/IMS session initiated from the femtocell. The mobile station can be authenticated using a 1xRTT authentication method. The authentication response includes an AUTHR value. A home subscriber server is used to authenticate the femtocell. A 1xRTT HLR/AC is used to authenticate the mobile. The IMS network ties the 1xRTT session information with the SIP session initiated by the femtocell.

The femtocell is connected to multiple mobile stations and different femtocell identifiers are assigned to different mobile stations. The femtocell identifiers are associated with corresponding mobile identification numbers of the mobile stations. Communication links are established between multiple femtocells and an IMS network, each femtocell communicating with one or more mobile stations, and calls addressed to particular mobile stations identified by their mobile identification numbers or mobile directory number or other mobile specific identifier are routed to corresponding femtocells using the femtocell identifiers associated with the mobile identification numbers.

In general, in another aspect, a authentication response is received from a mobile station that is not configured to register with a session initiation protocol (SIP) network. An SIP message is sent to a server, the SIP message including the authentication response, in which the server is capable of authenticating the mobile station based on the authentication response or forwards the authentication response to another server that is capable of authenticating the mobile station. An SIP message is received from the server indicating that the mobile station has been authenticated.

Implementations may include one or more of the following features. The first SIP message includes at least one of an SIP INVITE request, an SIP MESSAGE request, SIP INFO method, and an SIP 18x response. The mobile station includes at least one of a second generation (2G) and a third generation (3G) circuit mode mobile communication device. In some examples, sending an SIP message includes sending an SIP message having a multipurpose internet mail extensions (MIME) payload that includes the authentication response. In some examples, sending an SIP message includes sending an SIP message having an SIP header that includes the authentication response. Receiving the authentication response from the mobile station includes receiving an AUTHR value from the mobile station. Key values are received from the server to enable secure communication with the mobile station. The key values include SMEKEY and PLCM keys.

In general, in another aspect, a femtocell sends a challenge to a mobile station, and receives a first authentication response from the mobile station through a wireless link, the first authentication response being generated based on the challenge and an authentication key stored at the mobile station. After the femtocell has been registered with an IMS network, the femtocell generates a second authentication response based on the first authentication response, and provides the second authentication response to the IMS network for authenticating the mobile station to enable the mobile station to access the IMS network.

Implementations may include one or more of the following features. The authentication response is a 1xRTT authentication response based on the CAVE algorithm. The femtocell receives the information from the mobile that was received in the first response and puts it into a payload or extension header of the SIP message. The femtocell copies the second authentication response from the first authentication response received from the mobile according to payload or SIP extension header format. The mobile station is compatible with an authentication process based on CAVE (cellular authentication and voice encryption) algorithm. The mobile station generates a signaling message encryption key (SMEKEY) and a private long code mask (PLCM) internally but does not transmit the SMEKEY and PLCM wirelessly to the femtocell. The mobile station is not compatible with an authentication process based on AKA (authentication and key agreement) protocol. The femtocell derives the challenge from a random challenge provided by the IMS network.

In general, in another aspect, in an IP multimedia subsystem (IMS) network, a first module retrieves an authentication response (e.g., AUTHR) from a payload of an SIP message received from a femtocell. The first module transmits a message to a second module, the message having information from the authentication response, receives a authentication result from the second module, and forwards the authentication result to the femtocell. The second module (e.g., HLR in the 1xRTT core network) authenticates the mobile station based on a comparison of the authentication responses and a pre-configured secret (e.g., a secret configured for 1xRTT CAVE authentication).

Implementations may include one or more of the following features. The first module includes a convergence server (CSRV). The first module includes an interface to a serving call session control function (S-CSCF). The first module retrieves the authentication response from the SIP message payload. The first module recognizes that the remote client does not support full IMS authentication. The first module recognizes that the femtocell supports CAVE (cellular authentication and voice encryption) based authentication. The first module generates ANSI-41 authentication request based on the authentication response and sends the authentication response to the second module. The first module, which can be a CSRV, ties a femtocell identifier assigned to the mobile station to a mobile identifier (e.g., identification number, mobile directory number, or other mobile specific identifier) of the mobile station so that future calls or communications directed to the mobile from the core network are correctly routed to the femtocell using the femtocell identifier. The mobile station is compatible with an authentication process based on CAVE (cellular authentication and voice encryption) algorithm. The mobile station generates an authentication response (AUTHR), a signaling message encryption key (SMEKEY), and a private long code mask (PLCM) and transmits the AUTHR to the client device wirelessly but does not transmit the SMEKEY and PLCM to the client device. The mobile station is not compatible with an authentication process based on AKA (authentication and key agreement) protocol. The second module includes a 1xRTT core HLR, a HSS with connectivity to a 1xRTT core HLR, or a HSS having 1xRTT authentication information.

In general, in another aspect, a femtocell registers with a network using a session initiation protocol (SIP) authentication process, receives a authentication response from a mobile station, and forwards the authentication response to a server using an SIP message to enable the mobile station to be authenticated based on the authentication response, in which the server is capable of authenticating the mobile station based on the authentication response, or forwards the authentication response to another server that is capable of authenticating the mobile station.

Implementations may include one or more of the following features. The femtocell assigns an identifier to the mobile station. The network includes an IMS network. The femtocell is pre-configured with a plurality of generic IMS credentials each of which can be used to authenticate the femtocell. The mobile station is configured to be authenticated using 1xRTT authentication. The authentication response includes an AUTHR value. The femtocell sends a femtocell secret key to a server to cause the femtocell to be authenticated. The femtocell wirelessly connects to multiple mobile stations that are not configured to be authenticated using the SIP authentication process, assigns different femtocell identifiers to different mobile stations, and enables the mobile stations to be authenticated by carrying the secret keys of the mobile stations in SIP messages sent from the femtocell to the server.

In general, in another aspect, a femtocell receives a authentication response from a mobile station that is registered with the session initiation protocol (SIP) network, sends an SIP message to a server, the SIP message including the authentication response, in which the server is capable of authenticating the mobile station based on the authentication response or forwards the authentication response to another server that is capable of authenticating the mobile station, and receives an SIP message from the server indicating that the mobile station has been authenticated.

Implementations may include one or more of the following features. The SIP message includes at least one of an SIP INVITE request, an SIP MESSAGE request, an SIP INFO request, and an SIP 18x response. The mobile station includes at least one of a second generation (2G) and third generation (3G) circuit mode mobile communication device. In some examples, the SIP message includes an MIME payload that includes the authentication response. In some examples, the SIP message includes an SIP header that includes the authentication response. The authentication response includes an AUTHR value. The femtocell receives key values from the server and initiates secure communication with the mobile station using the key values. The key values include SMEKEY and PLCM keys.

These and other aspects and features, and combinations of them, may be expressed as methods, apparatus, systems, means for performing functions, computer program products, and in other ways.

Advantages of the systems and methods can include one or more of the following. Legacy 2G handsets can connect to an IMS network through a femtocell without changes to the 2G handsets. Users of 2G and third generation (3G) circuit mode handsets can access services provided by the IMS network. The IMS core infrastructure does not need to be changed. A security mechanism provides an adequate level of security for the legacy handsets using the femtocell to connect to the IMS network. The system and methods can be applied to 3GPP2 IMS/MMD networks, 3GPP IMS networks connecting legacy handsets (e.g., UMTS or GSM handsets), and other SIP networks in general that are used to connect legacy mobile networks.

DESCRIPTION

This document describes a femtocell (also referred to as an access point base station) that enables a legacy mobile station (e.g., a 2G or 3G circuit mode mobile phone) to connect to an IMS network and access new services provided by the IMS network. The femtocell communicates with the mobile station and the IMS network to enable the IMS network to authenticate the mobile station even though the mobile station may not support IMS authentication procedures.

The following definitions and abbreviations are used in this document:

2G Second generation
3G Third generation
3GPP2 3rd Generation Partnership Project 2
AAA Authentication, authorization, and accounting
AC Authentication center
AKA Authentication and key agreement
AUTN Authentication token
CAVE Cellular authentication voice and encryption
CDMA Code division multiple access
CHAP Challenge handshake authentication protocol
CK Cypher key
DH Diffie-Hellman
ESN Electronic serial number
GSM Global system for mobile communications
HLR Home location register
HSS Home subscriber server
IETF Internet Engineering Task Force
IK Integrity key
IMPI IMS private identity
IMPU IMS public identity
IMS IP multimedia subsystem
IMSI International mobile station identity
IP Internet protocol
MAC Message authentication code
MD5 Message Digest version 5
MDN Mobile directory number
ME Mobile equipment, referring to a terminal without a R-UIM
MEID Mobile equipment identity
MIME Multipurpose internet mail extensions
MIN Mobile identification number
MMD Multimedia domain
MS Mobile station
MSC Mobile switching center
NAI Network access identifier
OEP Other end port
PAP Password authentication protocol
P-CSCF Proxy call session control function
PLCM Private long code mask
PSTN Public switched telephone network
RADIUS Remote authentication dial in user service
RRQ Registration request
R-UIM Removable user identity module
SHA-1 Secure hash algorithm 1
SIP Session initiation protocol
SMEKEY Signaling message encryption key
SQN Sequence number
SSD Shared secret data
TCP Transport control protocol
TLS Transport layer security
UATI Unicast AT identifier
UDP User datagram protocol
UIM User identity module
UMTS Universal mobile telecommunications system
URI Universal resource indicator
USIM User service identity module
VLR Visited location register
VPN Virtual private network Integrated MS and IMS/SIP Authentication The following describes a method of registering a legacy mobile station with an IMS network through a femtocell in which an 1xRTT authentication method is integrated with an IMS/SIP authentication method.

Figure 1:
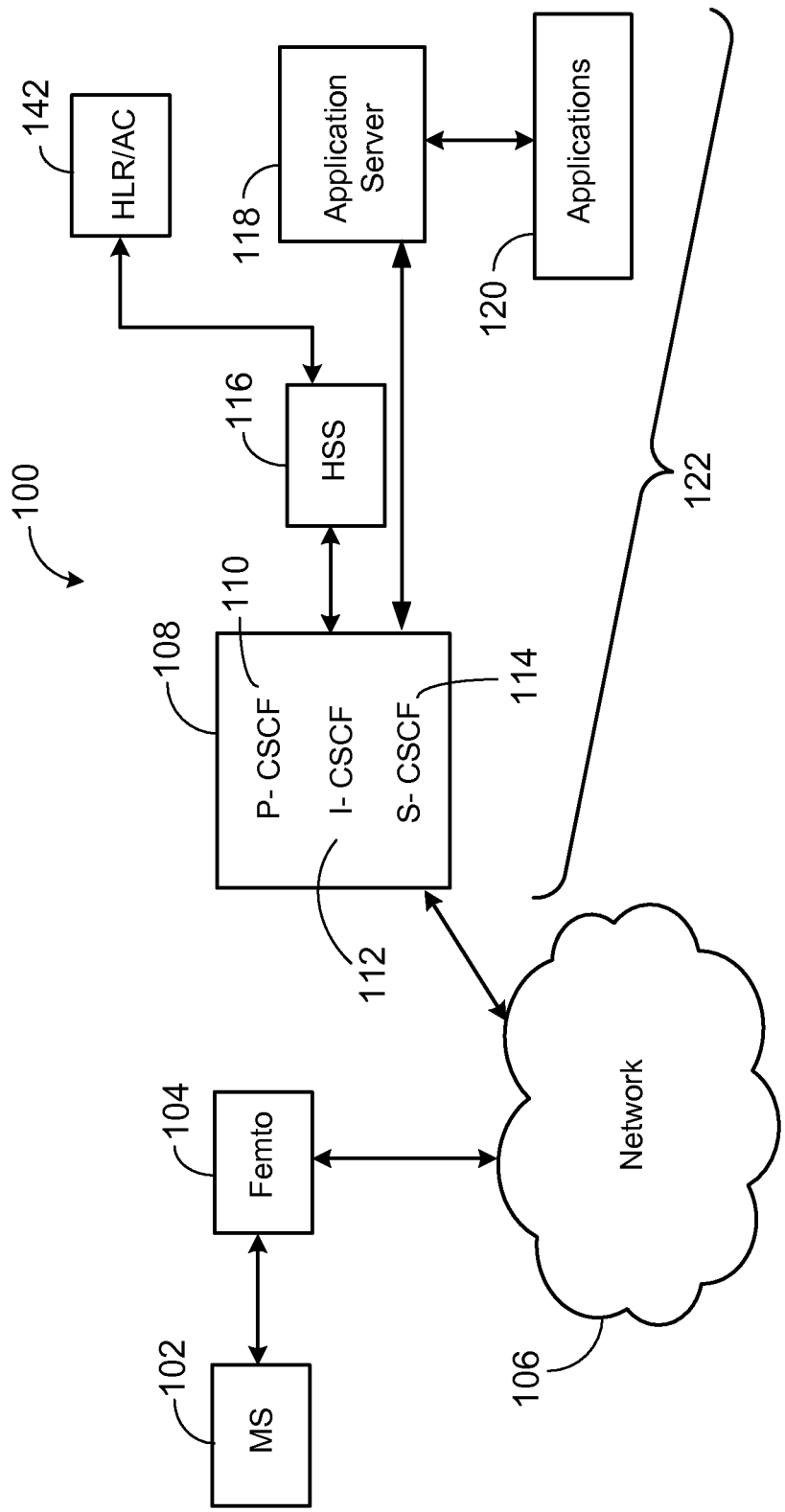
FIG. 1 is a schematic diagram of a telecommunication system.

Referring to FIG. 1, in some implementations, a telecommunication system 100 includes a mobile station (MS) 102 that accesses an IMS network 122 through a femtocell 104. The mobile station 102 can be, for example, a 2G handset that does not fully support IMS functionalities. The femtocell 104 serves as a bridge between the mobile station 102 and the IMS network 122. The IMS network 122 may serve as a bridge to connect to an 1xRTT macro network or a public switched telephone network (PSTN) for the mobile. The femtocell 104 communicates wirelessly with the mobile station 102 using a 2G compatible protocol to obtain security information that can be used to generate security keys which in turn can be used by the IMS network 122 to authenticate the mobile station 102.

The IMS network 122 uses an authentication process that uses the AKA algorithm. Because the mobile station 102 does not support full IMS authentication, the mobile station 102 is not directly authenticated by the IMS network 122. Instead, the IMS network 122 authenticates the mobile station 102 indirectly through the femtocell 104. The femtocell 104 generates an authentication response based on an authentication response received from the mobile station 102. The IMS network 122 then verifies the authentication response from the femtocell 104, thereby authenticating the mobile station 102.

In some examples, the mobile station 102 supports an authentication process that uses the CAVE algorithm. The femtocell 104 receives a message from the IMS network 122 that includes information about a random challenge RAND generated by the IMS network 122. The femtocell 104 derives the random challenge RAND from the message and sends the random challenge RAND to the mobile station 102. In response, the mobile station 102 generates an authentication response AUTHR based on a secret key, referred to as the A-key, stored in the mobile station 102. The mobile station 102 sends AUTHR to the femtocell 104.

The femtocell 104 generates an AKA key based on AUTHR, then generates an authentication response RES by applying the AKA algorithm to the AKA key. The femtocell 104 sends the authentication response RES to the IMS network 122. The IMS network 122 compares the authentication response RES with a corresponding response XRES derived by the IMS network 122 based on the random number RAND. If the authentication responses RES and XRES match, the IMS network 122 considers the mobile station 102 to be authenticated.

After the mobile station 102 is authenticated, the mobile station 102 can access various applications 120 provided by an application server 118. The applications 120 can include, for example, access to Internet, e-mail services, sending images, streaming of audio and/or video, etc.

To serve as a bridge between the mobile station 102 and the IMS system 122, the femtocell 104 can be configured to support the following functionality:

The femtocell 104 translates the authentication interrogation contents derived from the IP-based session initiation protocol (SIP) signaling from the IMS network 122 into the 2G airlink authentication messages similar to those issued by a base station to the mobile station 102 while accessing a 2G CDMA system.

The femtocell 104 terminates and processes the HTTP Digest AKA procedure specified in the S.S0086 standard by using the 2G authentication information (e.g., AUTHR) received over the air from the mobile station 102.

The femtocell 104 does not have to maintain an authentication sequence number (SQN) associated with HTTP Digest AKA. Instead, the value of the SQN can be computed from session keys provided by a 2G CAVE-based authentication algorithm.

The femtocell 104 communicates the authentication response (e.g., RES) to the IMS network 122, as specified in S.S0086.

To authenticate the IMS network 122 and prevent replays, the femtocell 104 uses a combination of a conventional AUTN validation and a standard cnonce parameter defined for HTTP Digest in RFC 2617 and 3310. The femtocell 104 is also able to validate the network response to the cnonce.

The femtocell 104 uses conventional AKA procedures to generate the session keys for the IMS security between the femtocell 104 and a proxy call session control function (P-CSCF) 110.

The IMS network 122 includes a home subscriber server/authentication authorization and accounting server (HSS/AAA) 116. In some examples, the IMS HSS/AAA 116 does not contain security information related to the mobile station 102 (which in this example is a 2G handset) or the femtocell 104. Rather, the security information (e.g., A-key) is stored in a home location register/authentication center (HLR/AC) 142, which is an IS-41 device integrated into a signaling system 7 (SS7) network.

To use the security information and processes of the HLR/AC 142, the HSS/AAA 116 can be configured to meet the following requirements:

The HSS/AAA 116 uses the SS7-based IS-41 interface and supports an IS-41 transaction, the authentication request (AUTHREQ), which is sent to the HLR/AC 142. The HLR/AC 142 views the HSS/AAA 116 as an IS-41 visited location register (VLR). This can also be achieved by employing an SS7-to-IP translator function which causes the HLR/AC 142 to appear to be an IP-based remote authentication dial-in user service (RADIUS) host to the HSS/AAA 116, while the HSS/AAA 116 appears to be an IS-41 VLR to the HLR/AC 142.

The HSS/AAA 116 is capable of using session keys received from the HLR/AC 142 to generate the authentication vector for the IMS security.

The HSS/AAA 116 does not have to be provisioned with information regarding any specific femtocell user.

The HSS/AAA 116 can be provisioned with certain rules indicating that certain types of IMSI/IMPI or user identifiers are routed to the appropriate HLR/AC 142. Domain names may be used to achieve this goal.

3GPP2 multimedia domain (MMD) provides an IP-based session control capability based on the SIP protocol. The MMD functionality can be used to enable services such as video telephony, push to talk, instant messaging, and presence, etc. To secure MMD-based services, the S.S0086B standard defines standard mechanisms for authentication, confidentiality and integrity protection.

The security mechanism described in this document includes an authentication function and offers confidentiality and integrity protection for SIP signaling messages, and replay protection to provide an adequate level of security for the legacy handsets using the femtocell 104 to connect to the IMS network 122.

The system 100 adopts procedures having portions that are similar to currently defined procedures in the S.S0086B standard. For example:

- The HTTP Digest AKA defined in RFC 3310 and specified in the S.S0086B standard is used for IMS authentication and setting the femtocell 104 to the P-CSCF 110 security association.
- The AKA authentication vector is generated in the HSS 116, while the secret key for the HSS 116 is generated from session keys obtained from the HLR 142, as the product of a successful CAVE-based authentication.
- The AKA procedure is terminated at the femtocell 104 instead of at the mobile station 102. The mobile station 102 can perform CAVE-based authentication over the 1xRTT airlink with the femtocell 104. The femtocell 104 uses the result of a successful CAVE-based authentication for performing AKA processing.
- The mutual authentication of the AKA (validation of AUTN) is supported without management of the SQN. The replay protection of the HTTP Digest protocol is used.

Figure 2:
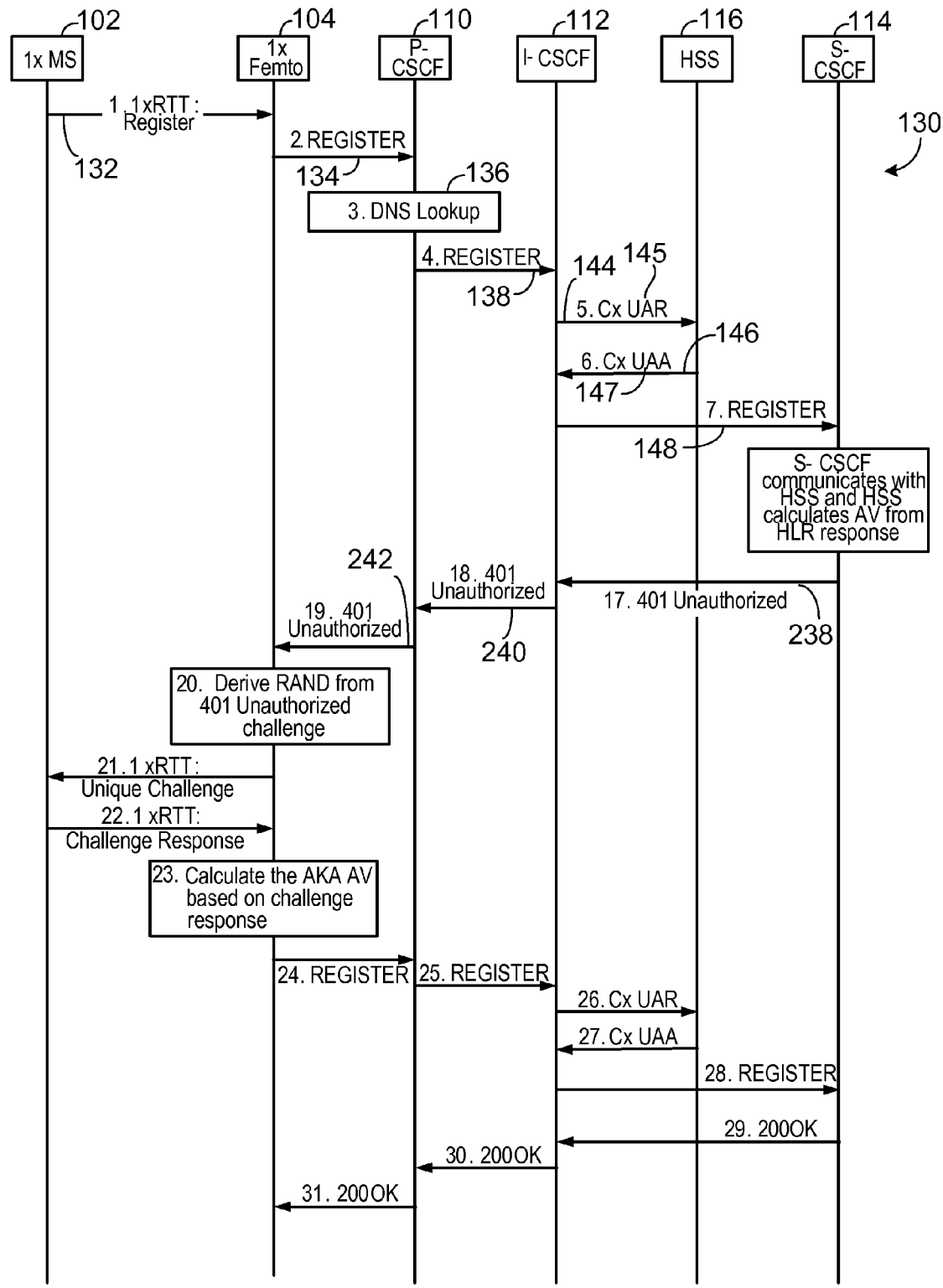
FIGS. 2 to 7 are signal flow diagrams.

Referring to FIG. 2, in some implementations, a process 130 can be used for authenticating the mobile station 102 and connecting the mobile station 102 to the IMS network 122. In this example, the mobile station 102 complies with 1xRTT authentication methods.

Step 1 (132): The mobile station 102 attempts to register with the femtocell 104.

Steps 2-8: Steps 2-8 can be similar to those in a normal IMS/MMD message flow. The IMS private identity (IMPI) can be set based on the electronic serial number (ESN) (or mobile equipment identify (MEID) if the mobile station 102 sends it in the airlink) using the tel URI format. The IMS public identity (IMPU) can be set to the mobile identification number (MIN) using the SIP universal resource indicator (URI) format. If the mobile directory number (MDN) is known, the IMPU can also be set to the tel URI using the MDN.

Step 2 (134): The femtocell 104 attempts to register with the P-CSCF 110 by sending an SIP REGISTER request. The SIP REGISTER request is described in "SIP: Session Initiation Protocol", Network Working Group Request for Comments: 3261, June 2002, the contents of which are incorporated herein by reference.

Step 3 (136): The P-CSCF 110 performs a DNS lookup.

Step 4 (138): The P-CSCF 110 attempts to register with the I-CSCF.

Step 5 (144): The I-CSCF 112 sends Cx: UAR 145 to the HSS 116.

Step 6 (146): The HSS 116 sends Cx: UAA 147 to the I-CSCF 112.

Step 7 (148): The I-CSCF 112 attempts to register with the S-CSCF 114.

Figure 3:
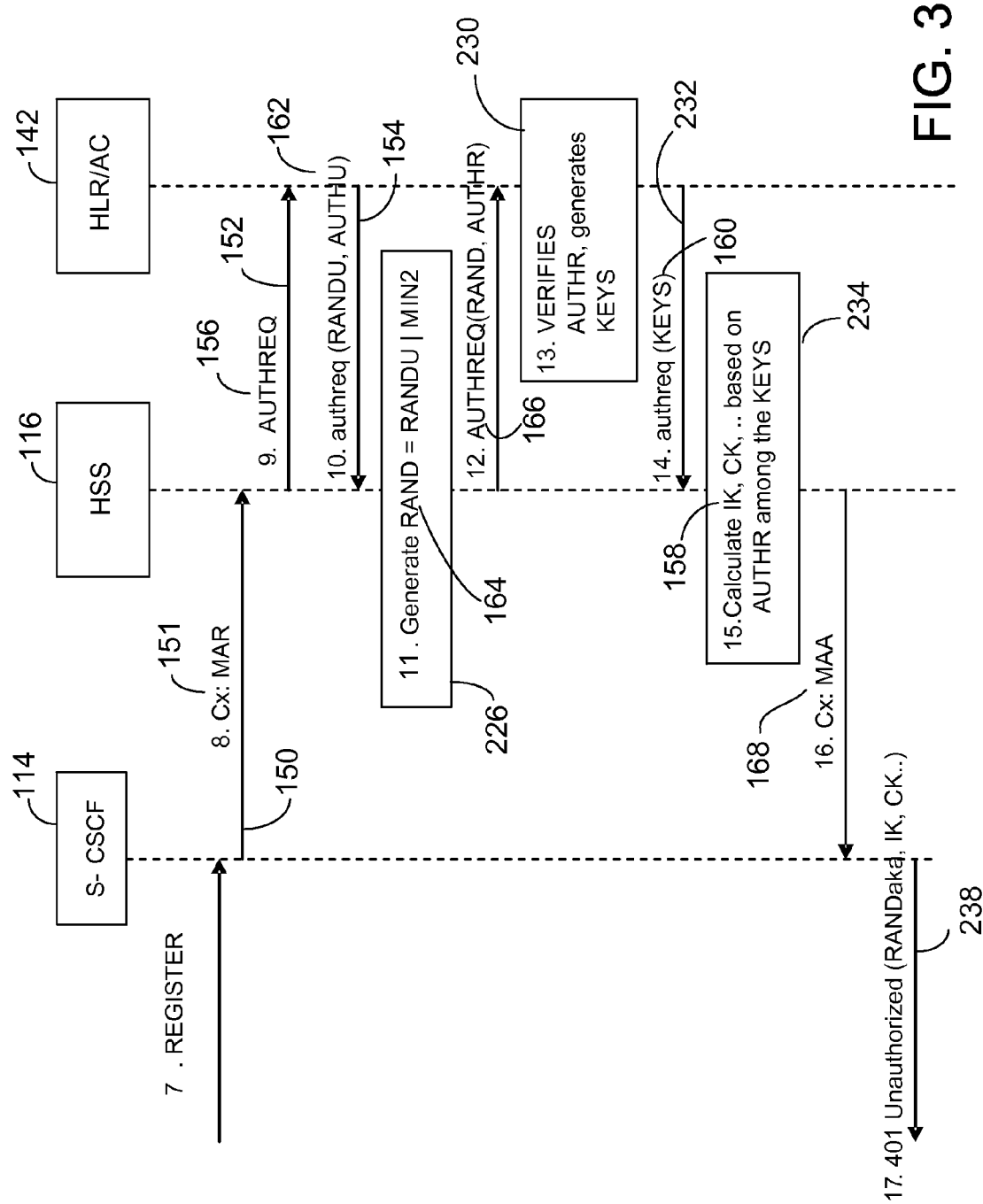

Referring to FIG. 3, in step 8, the S-CSCF 114 sends Cx: MAR 151 to the HSS 116 (150).

In steps 9 to 14, the HSS 116 calculates CK/IK 158 from the KEYS 160 returned by the HLR/AC 142.

Step 9 (152): When the HSS 116 receives an authentication request from the S-CSCF 114 with the IMPI and IMPU, the HSS 116 recognizes that the femtocell 104 does not support full IMS authentication, and recognizes that the femtocell 104 supports a CAVE-based authentication using the mobile station's authentication information. The HSS/AAA 116 recovers the MIN/ESN from the IMPI and IMPU, sends the IS-41 AUTHREQ 156 with the MIN/ESN to the HLR/AC 142.

Step 10 (154): The HSS 116 receives authreq(RANDU, AUTHU) 162 from the HLR/AC 142. In this example, it is assumed that MIN/ESN is contained in the IMPI as indicated above in steps 2-8.

Step 11 (226): The HSS 116 generates RAND=RANDU|MIN2 164.

Step 12 (228): The HSS 116 sends another AUTHREQ 166 with the RAND and AUTHR=AUTHU to the HLR/AC 142.

Step 13 (230): The HLR/AC 142 validates the AUTHR 240 and generates SMEKEY and PLCM keys 160 (referred to as KEYS in the figure).

Step 14 (232): The HLR/AC 142 responds and sends the HSS 116 the SMEKEY and PLCM keys.

Step 15 (234): The HSS 116 calculates the CK/IK 158 based on the combination of the SMEKEY, PLCM, and AUTHR.

The HSS 116 computes the AKA Key=SHA1(AUTHR, RAND). SHA1 represents secure hash algorithm 1. The resulting 160 bits are used as follows: the 128 least significant bits are used as the AKA 128-bit key. The remaining 32 bits padded with 16 zero bits are extended to 48 bits and used as the AKA SQN.

The steps 10 to 15 describe how the AKA key is generated from the 1xRTT CAVE algorithm output. The femtocell 104 is able to obtain the AUTHR over the air from the mobile station 102, but the femtocell 104 does not receive the SMEKEY or PLCM from the mobile station 102. In some examples, the femtocell 104 generates the AKA key using AKAKEY=SHA1 (AUTHR). In some examples, the RAND number is used as another parameter because SHA1 uses a certain number of bits as input (other values are usable, including fixed values).

The HSS 116 generates RANDaka by appending 96 random bits to the 32 bits of IS-41 RAND. Then the HSS 116 generates the AKA vector AV that includes AUTN, XRES, IK, CK, and RANDaka, where XRES is 128 bits long. The HSS 116 sends MAA 168 back to S-CSCF 114.

Step 16 (236): The HSS 116 sends AV to the S-CSCF 114, which sets the qop value to allow the cnonce to be set by the femtocell 104 according to RFC 2617.

Referring to FIG. 2, in step 17 (238), the S-CSCF 114 forwards the AV to the I-CSCF 112.

Step 18 (240): The I-CSCF 112 forwards the AV to the P-CSCF 110.

Step 19 (242): The P-CSCF 110 sends RANDaka and AUTN to the femtocell 104.

Figure 4:
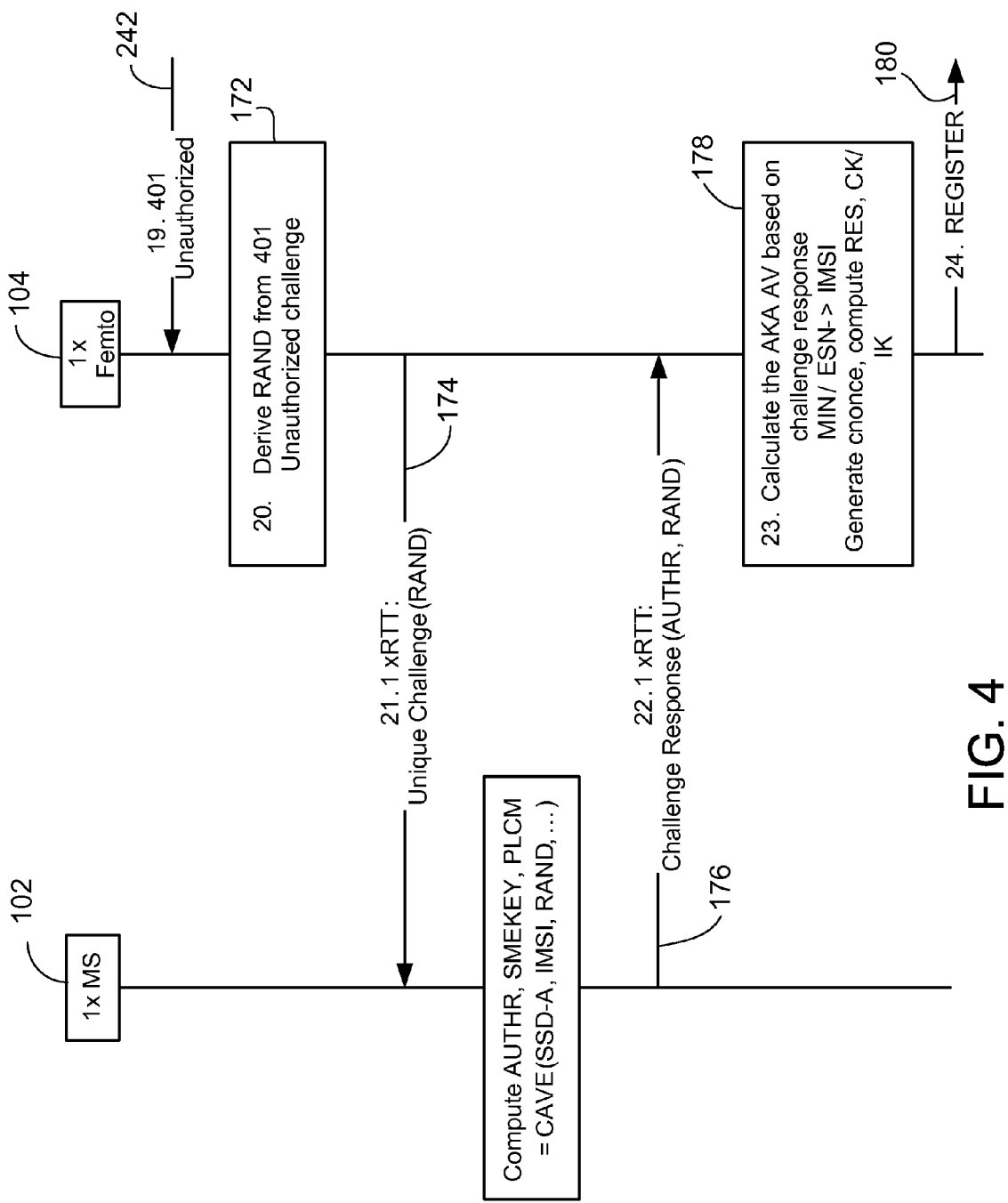

Referring to FIG. 4, in step 20 (172), the femtocell 104 extracts the RAND value from RANDaka.

Step 21 (174): The femtocell 104 sends the RAND value to the mobile station 102 as a unique challenge for an origination or a page response.

Step 22 (176): The mobile station 102 computes the AUTHR, PLCM, and SMEKEY, and returns the AUTHR to the femtocell 104 as a unique challenge response.

Step 23 (178): The femtocell 104 generates the AKA key and SQN in the same way as the HSS 116 (in steps 15-16). From the received "401 Unauthorized" message in step 19, the femtocell 104 takes the AUTN, which includes a MAC and the SQN. The femtocell 104 calculates the XMAC and checks that XMAC=MAC as specified in the S.S0086 standard but without checking the SQN. If the MAC checking is successful, the femtocell 104 runs the AKA algorithm to calculate the AKA result (RES, IK, CK) with RANDaka, where the RES is 128 bits long. The femtocell 104 uses CK/IK to generate a security association with the P-CSCF 110.

Step 24 (180): The femtocell 104 generates the response using RES and some other parameters based on RFC 3310 and sends the response to the network along with cnonce set to a random number generated by the femtocell 104. The cnonce value is an opaque quoted string value provided by the SIP client (in this example, the femtocell 104) and used by both the client and the SIP server (in this example, the S-CSCF 114) to avoid chosen plaintext attacks, to provide mutual authentication, and to provide some message integrity protection. RES is used as the password in request-digest calculation.

Referring to FIG. 2, in steps 25-28, the P-CSCF 110 forwards the response to S-CSCF 114 in messages SM8 and SM9.

Steps 29-30: Upon receiving SM9 containing the response, the S-CSCF 114 retrieves the active XRES for the mobile station 102 and uses this to check the authentication response sent by the femtocell 104 as described in RFC 3310. The S-CSCF 114 sends a 200 OK message to P-CSCF 110. XRES is used as the password in the response-digest calculation.

Step 31: The P-CSCF 110 forwards a 200 OK to the femtocell 104.

The femtocell 104 checks the 200 OK message by validating the cnonce using RES as password. If the result of the femtocell 104 authenticating network is a failure, the femtocell 104 destroys the security association (CK, IK) set up in SM7.

The technique described above for carrying the mobile station authentication credentials in the IMS authentication credentials can also be applied to authentication of other types of mobile stations, such as universal mobile telecommunications system (UMTS) mobile stations. For example, the femtocell 234 can receive UMTS user service identity module (USIM) authentication credentials from a UMTS mobile station, and derive an authentication response from the USIM authentication credentials. The femtocell 234 forwards the authentication response to an authentication server, which authenticates the UMTS mobile station based on the authentication response from the femtocell 234. The technique can also be applied to authenticating mobile stations that comply with other communication standards, such as GSM or WiMAX.

Non-Integrated MS and IMS/SIP Authentication

The following describes a method of registering a legacy mobile station with an IMS network through a femtocell in which an IMS/SIP authentication occurs separately from an 1xRTT authentication.

Figure 5:
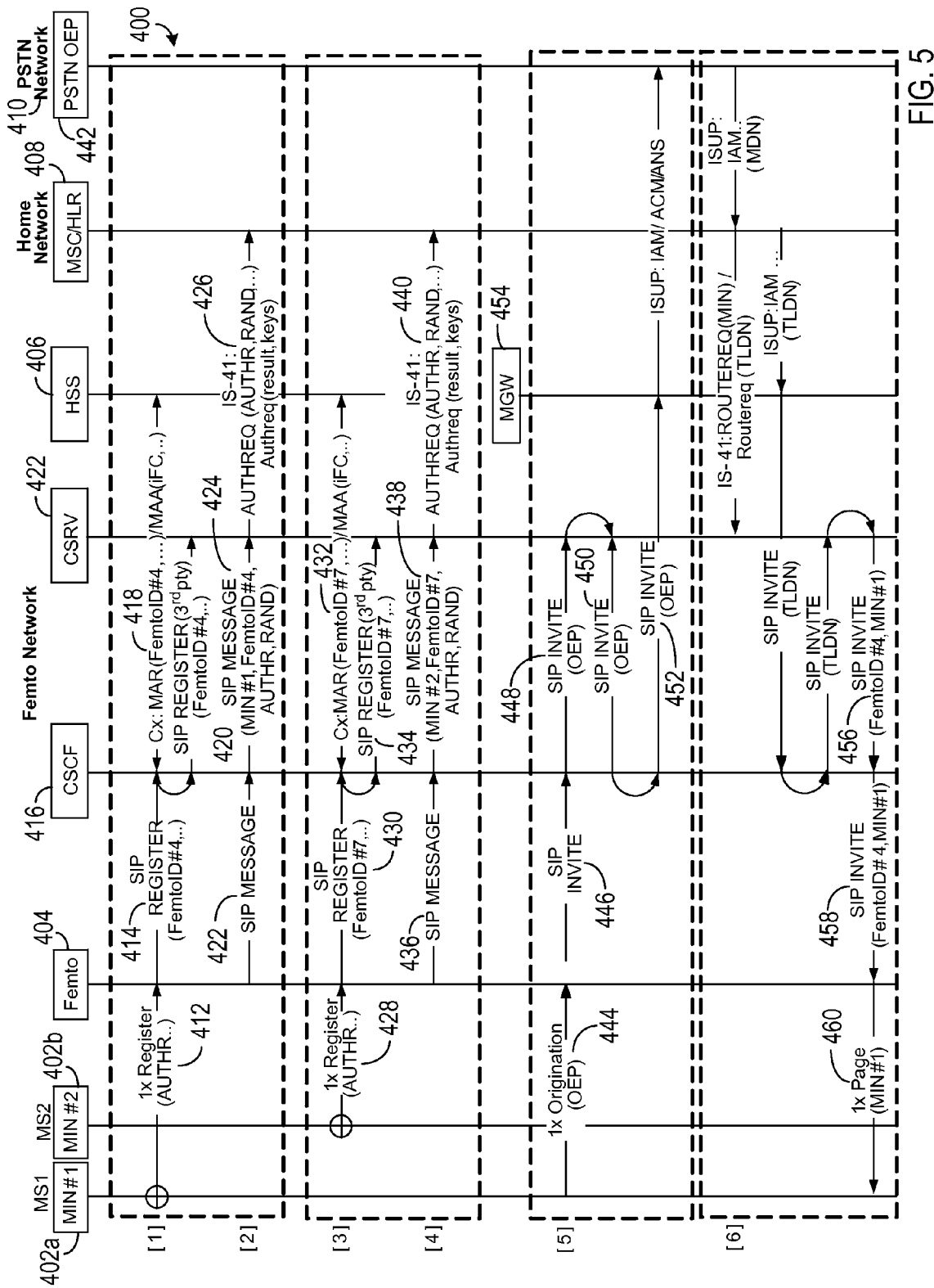

FIG. 5 shows an example of a message flow diagram of a process 400 representing a flow of messages that can be used for authenticating mobile stations (e.g., 402a and 402b, collectively referenced as 402) and enabling the mobile stations 402 to access services provided by an IMS network.

A femtocell 404 and an HSS 406 are configured with n generic IMS credentials (generic femto user IMPI/IMPUs), allowing the femtocell 404 to have up to n SIP user agents. The generic femto user IMPI/IMPU is pre-configured in the femtocell 240 with no pre-determined knowledge of who is allowed to use the femtocell 404. Whenever a user tries to register with the femtocell 404, the femtocell 404 dynamically allocates one of the available generic IMS credentials to the mobile user.

When a 1xRTT mobile station registers with the IMS network, the femtocell 404 carries out an IMS registration using one of the SIP user agents that is available. The same 1xRTT user may use different IMS credentials for different registrations. After the IMS registration, the 1xRTT users are authenticated by using SIP MESSAGE requests to carry 1xRTT authentication information.

The SIP MESSAGE request is described in "Session Initiation Protocol (SIP) Extension for Instant Messaging", Network Working Group Request for Comments: 3428, December 2002, the contents of which are incorporated herein by reference. In this description, the term "SIP message" refers generally to a message exchanged during an SIP session. For example, an SIP message can be an SIP request or an SIP response. The term "SIP MESSAGE" refers to the SIP MESSAGE request described in "Session Initiation Protocol (SIP) Extension for Instant Messaging", Network Working Group Request for Comments: 3428.

In this example, the HSS 406 is configured to be capable of authenticating the femtocell 404 using the femtocell's secret key (e.g., one of femtocell's n generic IMS credentials). An MSC/HLR 408 is configured to have relevant security information for authenticating the legacy mobile stations 402.

The process 400 includes six major steps, steps [1] to [6], each including multiple sub-steps. In steps [1] and [2], the first mobile station 402a registers with the IMS network. In steps [3] and [4], the second mobile station 402b registers with the IMS network. In steps [5] and [6], the first mobile station 402a exchanges messages with another party through a PSTN network 410. Note that there may be additional steps that are not shown in the figure.

The femtocell 404 is pre-configured with a number of femtocell identifiers (FemtoIDs). When a mobile station 402 registers with the femtocell 404, the femtocell 404 allocates a FemtoID to the mobile station 402. Because there may be more than one femtocell 404 connected to the IMS network, the FemtoID can be used to allow the IMS network to properly route packets to the mobile station 402 through the correct femtocell 404.

In step [1], the first mobile station 402a performs a 1xRTT registration (412) with the femtocell 404 and sends the mobile station's secret key AUTHR to the femtocell 404. The femtocell 404 registers with the HSS 406 by performing an SIP registration. The femtocell 404 is authenticated by the HSS 406 using the femtocell's own secret key (e.g., one of the n generic IMS credentials). The femtocell 404 sends an SIP REGISTER request 414 that includes a femtocell identifier (in this example, FemtoID #4) to a CSCF 416. The CSCF 416 sends Cx:MAR(FemtoID#4, ... )/MAA (iFC, ... ) 418 to the HSS 406. The femtocell 404 also sends an SIP REGISTER ($3^{rd}$ party) request 420 that includes FemtoID #4 to a convergence server (CSRV) 422.

The convergence server 422 is a device that connects the IMS network with 1xRTT core network. The key function of the convergence sever 422 in this case is to convey information between the IMS network and the ANSI-41 based 1xRTT core network. During an authentication process, the convergence server 422 is able to retrieve authentication information from SIP messages and send the authentication information in ANSI-41 compliant message formats to the 1xRTT core network to be authenticated. The convergence sever 422 can also retrieve mobile station user profiles so that the IMS network knows what types of services are allowed for the mobile station user. This type of functionality is also applicable to 3GPP circuit networks, for example, UMTS or GSM core networks.

In step [2], the mobile station 402a is authenticated using its secret key (AUTHR) by the MSC/HLR 408. The femtocell 404 sends an SIP MESSAGE request 422 that includes AUTHR (from the mobile station 402a) to the CSCF 416. The CSCF 416 sends an SIP MESSAGE request 424 including the mobile identification number (MIN#1), secret key (AUTHR), and RAND to the CSRV 422. The CSRV 422 sends an AUTHREQ (AUTHR, RAND, ...) message 426 to the MSC/HLR 408. The MSC/HLR 408 authenticates the mobile station 402*a* based on the secret key AUTHR.

The CSRV 422 received the FemtoID#4 in the SIP REGISTER request 420. The CSRV 422 also received the MIN#1 and FemtoID#4 in the SIP MESSAGE request 424. Based on this information, the CSRV 422 associates (or binds) MIN#1 with FemtoID#4, assuming that the 1xRTT registration of the mobile station 402*a* with the MSC/HLR 408 succeeds.

After step [2], the femtocell 404 has been registered and authenticated with the HSS 406 using FemtoID#4, the first mobile station 402*a* has been registered and authenticated with the MSC/HLR 408 using AUTHR, and the CSRV 422 has associated MIN#1 with FemtoID#4.

In step [3], the second mobile station 402*b* performs an 1xRTT registration 428 with the femtocell 404 and sends its secret key AUTHR to the femtocell 404. Similar to step [1], the femtocell 404 is authenticated using its own secret key (e.g., another one of the n generic IMS credentials). In step [3], the femtocell 404 uses a new FemtoID when exchanging messages with the IMS network.

The femtocell 404 sends a SIP REGISTER request 430 that includes a femtocell identifier (in this example, FemtoID#4) to the CSCF 416. The CSCF 416 sends Cx:MAR(FemtoID#7, ...)/MAA (iFC, ...) 432 to the HSS 406. The femtocell 404 sends an SIP REGISTER request 434 that includes FemtoID #7 to the CSRV 422.

In step [4], the second mobile station 402*b* is authenticated using its secret key AUTHR. The femtocell 404 sends an SIP MESSAGE request 436 that includes the secret key AUTHR of the mobile station 402*b* to the CSCF 416. The CSCF 416 sends an SIP MESSAGE request 438 that includes the mobile identification number (MIN#2), secret key (AUTHR), and RAND to the CSRV 422. The CSRV 422 sends an AUTHREQ (AUTHR, RAND, ...) message to the MSC/HLR 408. The MSC/HLR 408 authenticates the mobile station 402*b* based on the secret key AUTHR.

The CSRV 422 received the FemtoID#7 in the SIP REGISTER request 434. The CSRV 422 also received MIN#2 and FemtoID#7 in the SIP MESSAGE request 438. Based on this information, the CSRV 422 associates MIN#2 with FemtoID#7, assuming that the 1xRTT registration of the mobile station 402*b* with the MSC/HLR 408 succeeds.

After step [4], the femtocell 404 has been registered and authenticated with the HSS 406 using FemtoID#7, the second mobile station 402*b* has been registered and authenticated with the MSC/HLR 408 using AUTHR, and the CSRV 422 has associated MIN#2 with FemtoID#7.

In step [5], the first mobile station 402*a* communicates with another party through the PSTN network 410. The mobile station 402*a* uses a normal call flow by sending an 1xRTT origination message 444 to the femtocell 404, the message indicating that the destination phone number is OEP. The femtocell 404 sends an SIP INVITE request 446 to the CSCF 416. The SIP INVITE request is described in "SIP: Session Initiation Protocol", Network Working Group Request for Comments: 3261, June 2002.

The CSCF 416 sends an SIP INVITE request 448 to the CSRV 422. The CSRV 422 may modify the SIP INVITE request 448 to enable this call to go forward. For example, the CSRV 422 may insert an identification of the mobile user or a phone number of the mobile station 402*a* that the femtocell 404 did not include in the SIP INVITE request 446. The CSRV 422 sends the information as part of an SIP INVITE request 450 to the CSCF 416. The CSCF 416 sends an SIP INVITE request 452 that includes the OEP to a media gateway 454. The media gateway 454 sends an ISDN User Part (ISUP) message 456 to a PSTN OEP 442 to set up the telephone call.

In step [6], the remote party sends a message to the mobile station 402*a* through several steps that include the CSRV 422 sending an SIP INVITE request 456 to the CSCF 416. The SIP INVITE request 456 includes FemtoID#4 and MIN#1. The femtocell identifier FemtoID#4 allows the CSCF 416 to know which femtocell 404 to send the packet (e.g., there may be multiple femtocells 404 that communicate with the CSCF 416). The CSCF 416 sends an SIP INVITE request 458 to the femtocell 404, in which the SIP INVITE request 458 includes FemtoID#4 and MIN#1. Because MIN#1 is associated with the first mobile station 402*a*, the femtocell 404 sends a 1xRTT page 460 to the first mobile station 402*a*.

An advantage of a system that uses the process 400 is that configuring the HSS 406 is easy. The HSS 406 stores the authentication credentials of the femtocells 404, and does not need to store the authentication credentials of individual mobile stations 402. The IMS core infrastructure does not need to be changed.

There are a number of ways to reduce the amount of pre-configured authentication credentials that need to be stored in the IMS network (e.g., in the HSS 406). In some examples, instead of pre-allocating femtocell identifiers and other authentication information to a femtocell 404, the femtocell 404 can dynamically request identifiers and authentication credentials from a central entity in the network. In some examples, the femtocell 404 may be configured with a security code for making make such requests. Each time the femtocell 404 sends a request to the central entity, the central entity provides both the femtocell 404 and the HSS 406 with a femtocell identifier and associated authentication credentials, which allow the HSS 406 to authenticate the femtocell 404.

In some examples, each time the femtocell 404 sends a request to the central entity, the central entity provides a small set (e.g., five to ten) femtocell identifiers and associated authentication credentials to the femtocell 404 and the HSS 406. This way, the femtocell 404 does not have to send a request to the central entity every single time a mobile station tries to establish a new session. In some examples, the femtocell 404 and the HSS 406 can automatically generate the secrets (authentication credentials) from the femtocell identifiers. For example, the femtocell 404 may be preconfigured to generate a secret key from the femtocell identifier using a predetermined formula. The central entity may have knowledge of what the predetermined formula is, and sends the predetermined formula along with the femtocell identifier to the HSS 406 so that the HSS 406 can generate the secret key to authenticate the femtocell 404. Other ways of generating the secret keys can also be used.

In steps [1] and [3] described above, the femtocell SIP client (user agent) is authenticated using normal SIP/IMS authentication methods where the authentication information is assumed to be pre-configured into the femtocell 404 itself. The mobile stations 402 are not authenticated in these steps. Then in steps [2] and [4], the mobile stations are authenticated by carrying the mobile station's authentication information in SIP MESSAGE requests.

The technique described above can also be applied to authentication of UMTS mobile stations. The femtocell 234 can receive UMTS USIM authentication credentials from the UMTS mobile stations, and carry the credentials in SIP MESSAGE requests sent to a server capable of authenticating the UMTS mobile station. The technique can also be applied to authenticating mobile stations that comply with other communication standards, such as GSM or WiMAX.

Authentication Performed in Non-Registration Cases

In some implementations, authentication can be performed after the mobile station has already been registered. The femtocell 104 supports various methods for carrying the authentication information as part of the SIP messages exchanged with the IMS network 122. Over the air 1xRTT authentication can be performed in a number of cases, for example:

Initial registration and/or location update;
Connection setup (mobile originated and mobile terminated);
Unique challenge/BS challenge;
Application data sent over the access channel using 1xRTT data burst message; and
PACA update Note that for some of these cases information may be sent over the access channel without a connection being set up with the mobile station 102, the generic case being the application data sent over the access channel.

The initial SIP REGISTER based method used in the process 130 (FIGS. 2 to 4) and process 400 (FIG. 5) is designed to handle the first case of initial registration and/or location update.

For the other cases, there are a number of options. For example, in a first option, the SIP REGISTER method in the process 130 can be used for each of these events as they occur. This results in an SIP re-REGISTER occurring every time one of these events occur, which may result in a large number of SIP REGISTER events occurring in the IMS core network.

In a second option, one or more of the existing SIP methods can be used to carry the authentication information. This may involve adding new headers, payload types to existing SIP methods. A CSRV 182 can be used to handle the 1xRTT authentication. The CSRV 182 can also be part of the HSS 116.

In some examples, 1xRTT authentication information is carried in an SIP request, such as an SIP INVITE or SIP MESSAGE request. The SIP INVITE request can be used when there is an SIP session in progress, and the SIP MESSAGE request can be used when there are no SIP sessions in progress. From an wireless communication perspective these mirror the cases where the mobile station 102 has an active airlink connection (SIP INVITE) and when it does not (SIP MESSAGE).

Other SIP requests and SIP responses can also be used to carry the 1xRTT authentication information. For example, SIP INFO requests and SIP 18x responses (e.g., including 180 Ringing, 181 Call Is Being Forwarded, etc.) can be used to carry the 1xRTT authentication information. The SIP INFO request is described in "The SIP INFO Method", Network Working Group Request for Comments: 2976, October 2000, the contents of which are incorporated herein by reference.

A new MIME payload can be defined to carry the key authentication information that includes the AUTHR and RAND values from the femtocell to the IMS core network, and to carry authentication result that include the SMEKEY and PLCM values from the IMS core network to the femtocell. A new SDP content-type can be designated, for example, "Content-Type: application/1xRTTAuthentication". An example format for a request is shown below:

| Content-Type: | application/1xRTTAuthentication |
| Content-Length: | XXX |
| Type: | Request |
| AUTHR value: | YYYYYYYY |
| RAND value: | ZZZZZZZZ |

An example format for a response is shown below:

| Content-Type: | application/1xRTTAuthentication |
| Content-Length: | XXX |
| Type: | Response |
| Result: | Success/False |
| SMEKEY value: | WWWWWWWW |
| PLCM value: | VVVVVVVV |

Other content types and encoding methods can also be used.

In some examples, a new SIP message header can be defined to carry the 1xRTT authentication information. In some examples, existing SIP authentication header fields can be modified to carry the 1xRTT authentication information. In some examples, existing non-authentication related SIP header fields can be modified to carry the 1xRTT authentication information.

Figure 6:
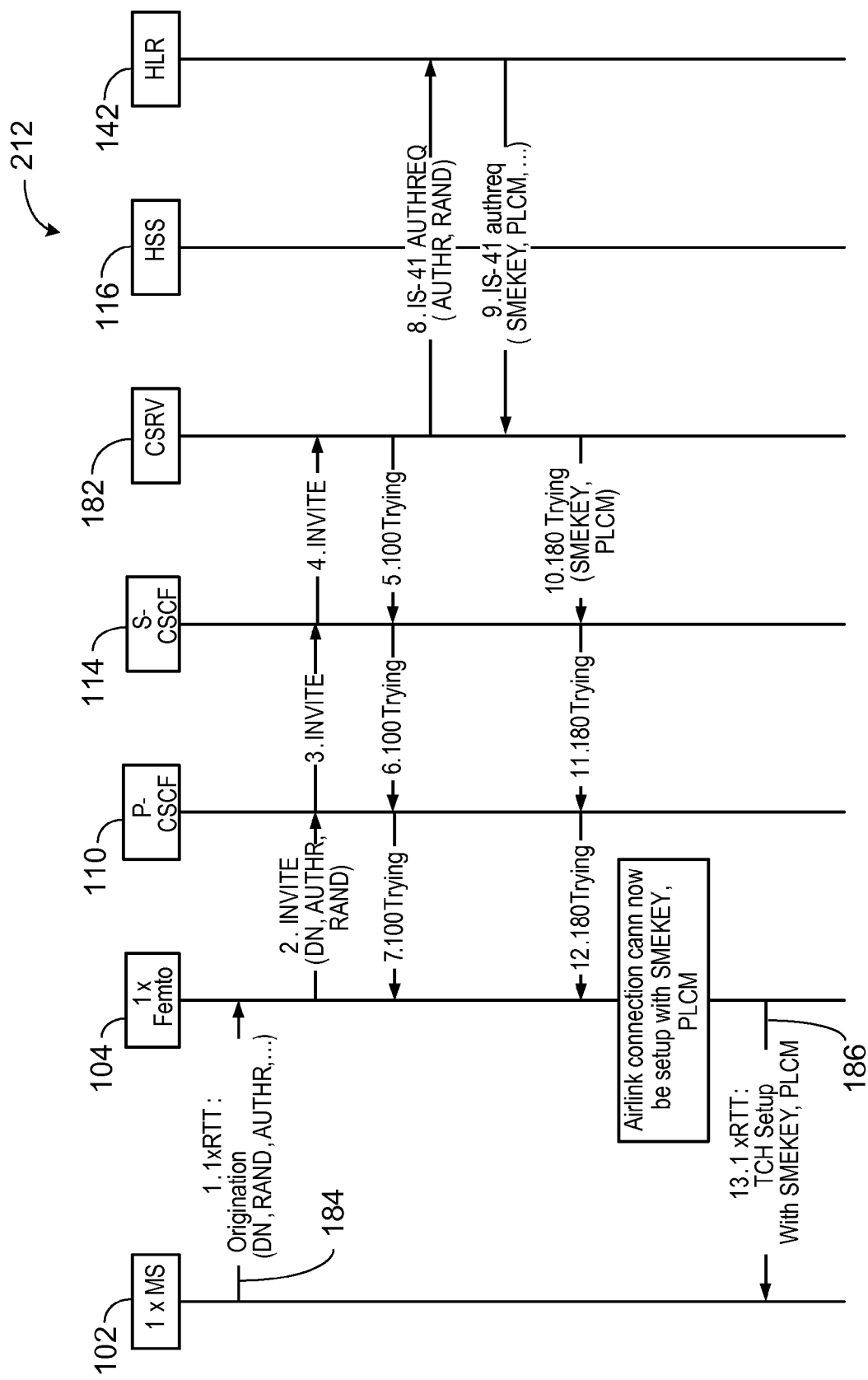

Referring to FIG. 6, in some implementations, a process 212 can be used to authenticate the mobile station 102 in which the SIP INVITE method and the payload type defined above are used to convey the 1xRTT authentication information.

Step 1 (184): The handset mobile station 102 sends a 1xRTT origination message 184 that includes authentication information (e.g., DN, RAND, AUTHR, etc.).

Steps 2 to 7: The femtocell 104 generates an SIP INVITE request. The femtocell 104 adds a payload with content type set to application/1xRTTAuthentication containing the AUTHR/RAND information received over the air from the mobile station 102.

Steps 8 to 12: The CSRV 182 communicates with the HLR 142 using the IS-41 signaling methods. Once the authentication results are received, the CSRV 182 sends the authentication results back to the femtocell 104 in a 180 Trying method.

Step 13 (186): When the femtocell 104 receives the SMEKEY, PLCM values, the femtocell 104 uses the privacy mode commands to enable the use of encryption over the air with the mobile station 102.

Figure 7:
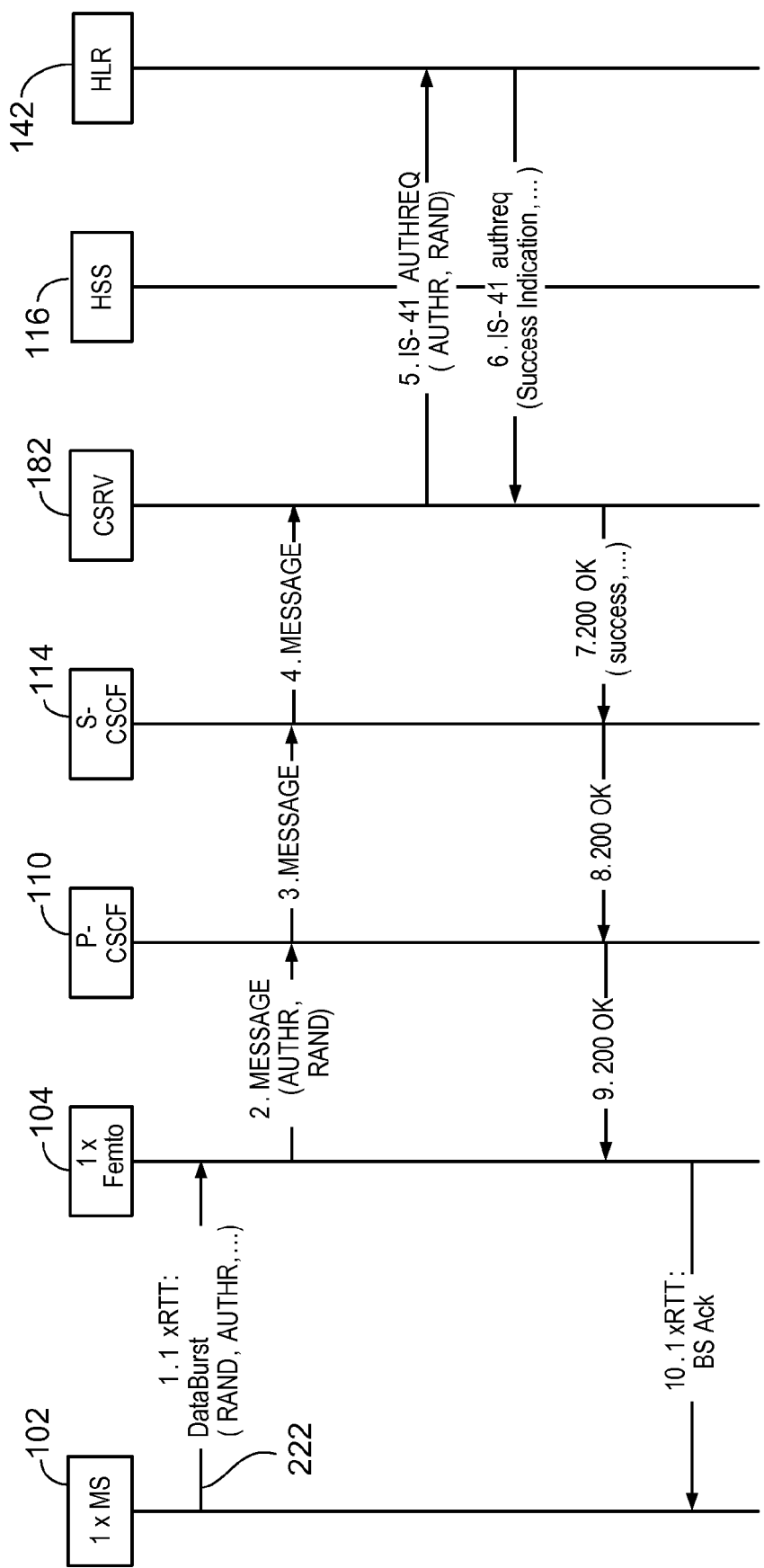

Referring to FIG. 7, in some implementations, a process 220 can be used authenticate the mobile station 102 in which the SIP MESSAGE method and the payload type defined above are used to convey the 1xRTT authentication information.

Step 1 (222): The mobile station 102 sends a 1xRTT data burst message (DBM) with authentication information. The DBM may convey information that is similar to an SMS message.

Steps 2 to 7: The femtocell 104 generates an SIP MESSAGE request. The femtocell 104 adds a payload with content type set to application/1xRTTAuthentication containing the AUTHR/RAND information received over the air from the mobile station 102.

Steps 8 to 12: The CSRV 182 communicates with the HLR 142 using the IS-41 signaling methods. After the authentication results are received, the CSRV 182 sends the authentication results back to the femtocell 104 in a 200 OK method.

Step 13: After the femtocell 104 receives the authentication results, the femtocell 104 replies back to the mobile station 102 using the 1xRTT signaling methods.

There are further aspects to consider in these solutions.

(1) The methods described above can be extended to network initiated cases (e.g., mobile terminated calls).

(2) For the SIP MESSAGE based solutions (e.g., process 220 in FIG. 7), assuming the original over-the-air message is not an SMS message, a destination SIP URI (e.g., CSRV-specific URI) can be defined.

Using the processes described above, the mobile station 102 (e.g., a 2G or 3G circuit mode mobile phone) can connect to the IMS network 122 through a femtocell 104 and access new data services provided by the IMS network 122.

Examples of Processes for Authenticating Mobile Stations

Figure 8:
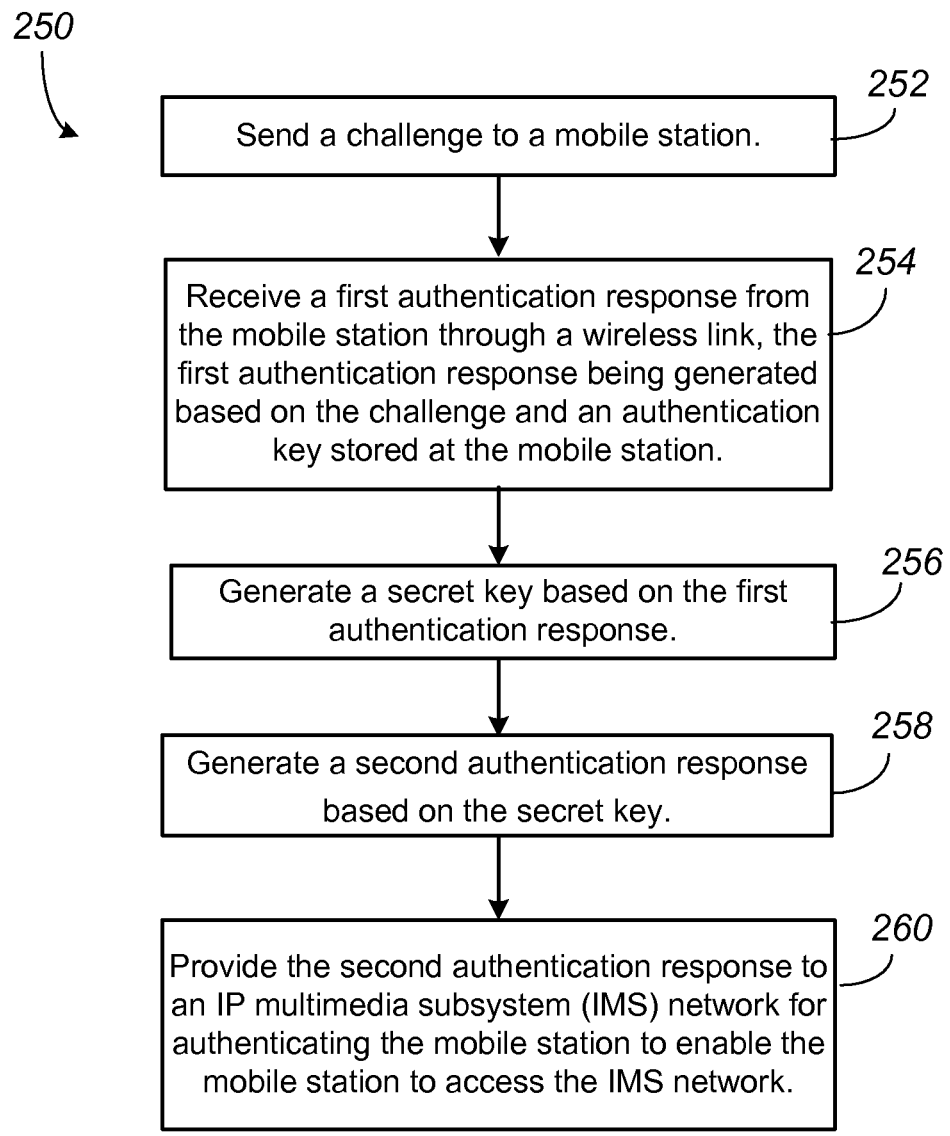
FIGS. 8 to 11 are flow diagrams of processes.

Referring to FIG. 8, in some implementations, a process 250 can be used to enable a mobile station to access an IMS network. For example, the mobile station can be a 2G handset that is compatible with an authentication process based on the CAVE algorithm.

A challenge is sent to a mobile station (252). For example, the mobile station can be the mobile station 102 (FIG. 1), and the femtocell 104 can send the challenge to the mobile station 102. The change can be RAND, a random challenge derived from a message provided by the IMS network.

A first authentication response is received from the mobile station through a wireless link (254). The first authentication response is generated based on the challenge and an authentication key stored at the mobile station. For example, the first authentication response can be AUTHR, and the authentication key can be A-key. The mobile station may also generate a signaling message encryption key (SMEKEY) and a private long code mask (PLCM) internally but does not transmit the SMEKEY and PLCM wirelessly to the femtocell. The mobile station may not support an authentication process based on AKA (authentication and key agreement) protocol.

A secret key is generated based on the first authentication response (256). For example, the secret key can be AKA key, and the AKA key can be generated using AKAKEY=SHA1 (AUTHR, RAND).

A second authentication response is generated based on the secret key (258). For example, the second authentication response can be RES that is generated according to hypertext transfer protocol (HTTP) digest authentication using AKA.

The second authentication response is provided to an IP multimedia subsystem (IMS) network for authenticating the mobile station to enable the mobile station to access the IMS network (260).

Figure 9:
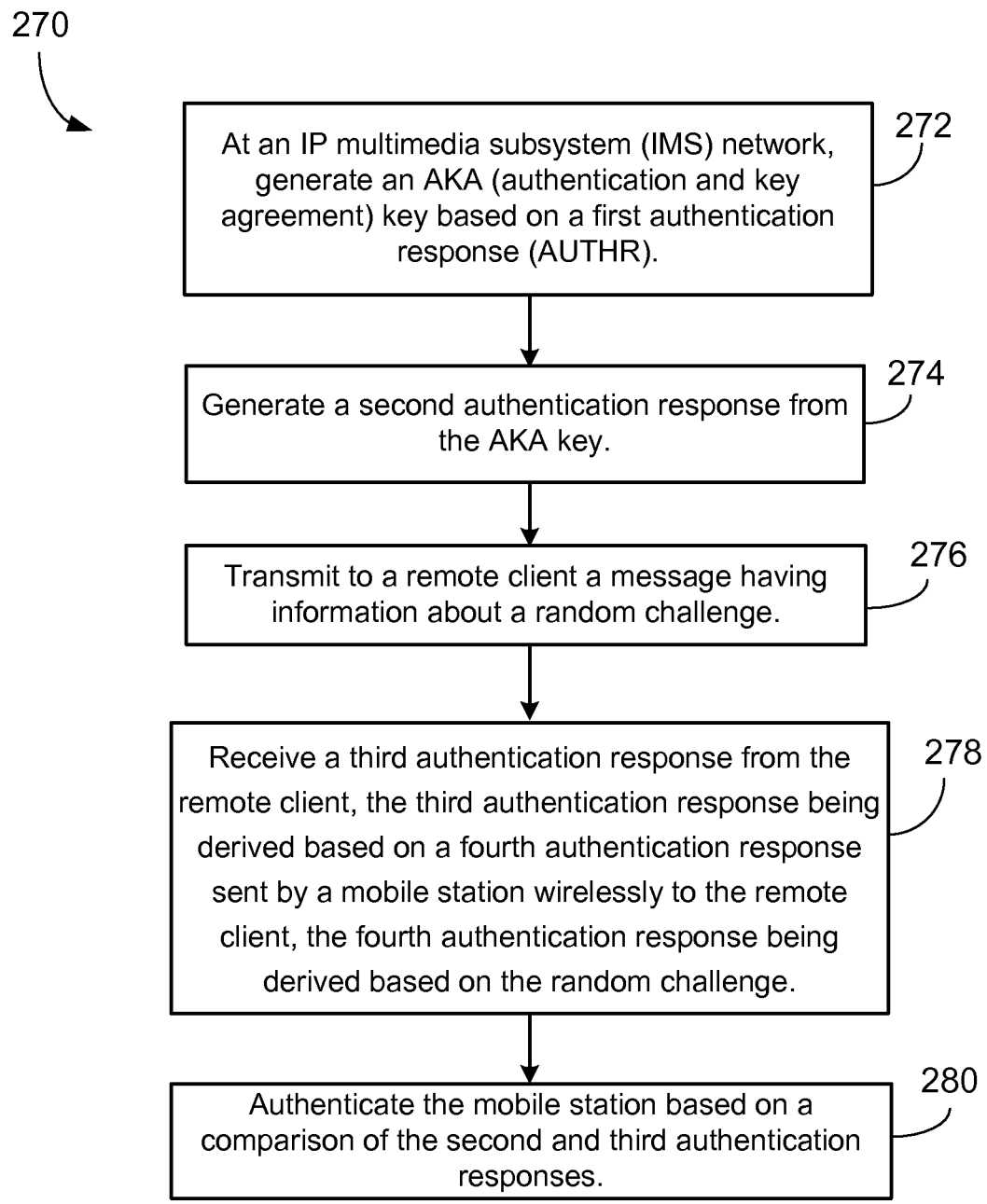

Referring to FIG. 9, in some implementations, a process 270 can be used to authenticate a mobile station. For example, the mobile station can be a 2G handset that is compatible with an authentication process based on the CAVE algorithm.

At an IP multimedia subsystem (IMS) network, an AKA key is generated based on a first authentication response AUTHR (272). For example, the AKA key can be generated by the HSS 116.

A second authentication response RES is generated from the AKA key (274). For example, the second authentication response RES can be generated by the HSS 116.

A message is transmitted to a remote client, the message having information about a random challenge (276). For example, the remote client can be the femtocell 104, and the message can be transmitted by the P-CSCF 110 to the femtocell 104.

A third authentication response is received from the remote client, the third authentication response being derived based on a fourth authentication response sent by a mobile station wirelessly to the remote client, the fourth authentication response being derived based on the random challenge (278). For example, the third authentication response can be RES, and the fourth authentication response can be AUTHR.

The mobile station is authenticated based on a comparison of the second and third authentication responses (280). The S-CSCF 114 can compare the second and third authentication responses and authenticate the mobile station.

Figure 10:
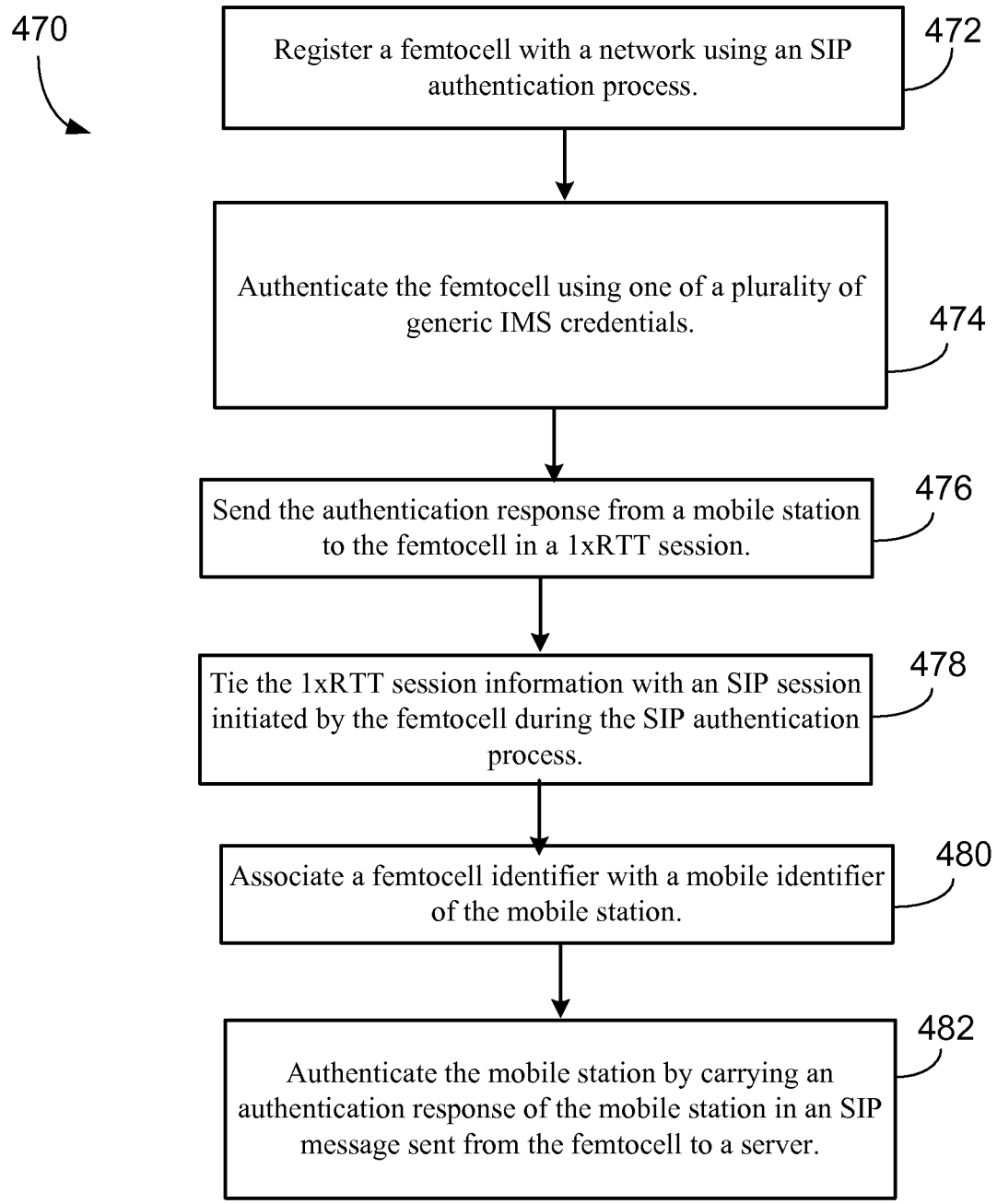

Referring to FIG. 10, in some implementations, a process 470 can be used to authenticate a mobile station. For example, the mobile station can be a 1xRTT, UMTS, or GSM mobile phone.

The process 470 registers a femtocell with a network using an SIP authentication process (472). For example, the network can be an IMS network, which can be a 3GPP IMS or 3GPP2 IMS network.

The process 470 authenticates the femtocell using one of a plurality of generic IMS credentials (474). For example, the generic IMS credentials can be pre-configured in the femtocell. Each of the generic IMS credentials can be used to authenticate an IMS/SIP session initiated from the femtocell. The femtocell can be authenticated using a home subscriber server.

The process 470 sends the authentication response from a mobile station to the femtocell in a 1xRTT session (476). For example, the authentication response can be an AUTHR value. The process ties the 1xRTT session information with an SIP session initiated by the femtocell during the SIP authentication process (478). The process 470 associates a femtocell identifier with a mobile identifier of the mobile station (480). For example, the mobile identifier can be a mobile identification number or a mobile directory number.

The process 470 authenticates the mobile station by carrying an authentication response of the mobile station's authentication response in an SIP message sent from the femtocell to a server (482). For example, the server authenticates the mobile station based on the authentication response or forwards the authentication response to another server that authenticates the mobile station. The server can be an HLR/AC server.

Figure 11:
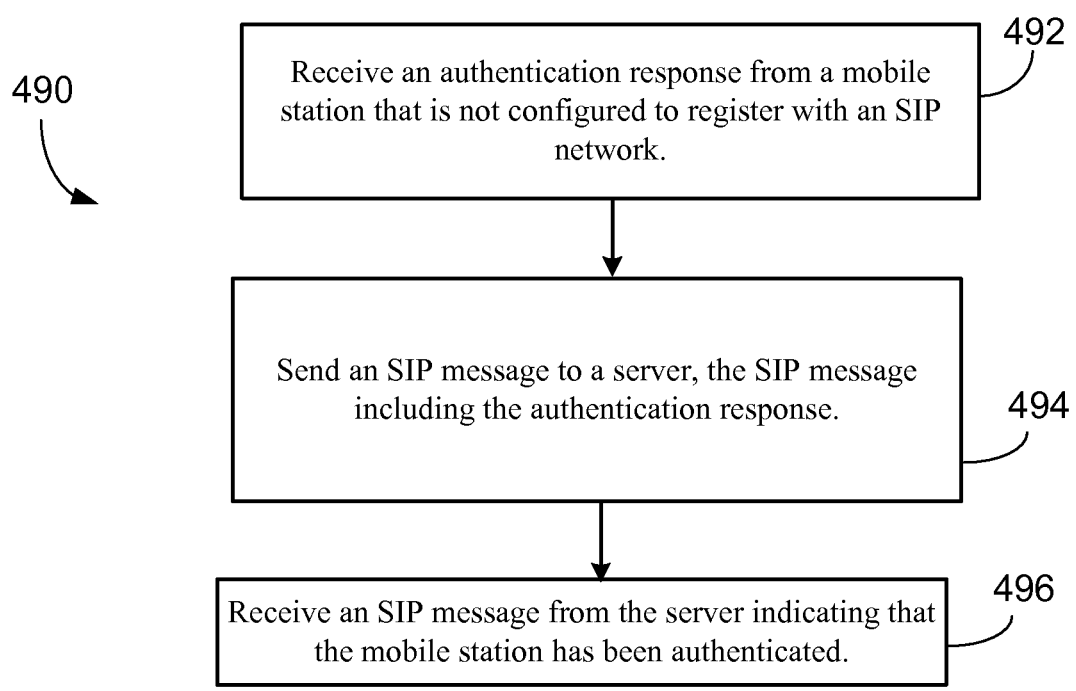

Referring to FIG. 11, in some implementations, a process 490 can be used to authenticate a mobile station in a non-registration situation. For example, the mobile station can be a 1xRTT, UMTS, or GSM mobile phone.

The process 490 receive an authentication response from a mobile station that is not configured to register with an SIP network (492). For example, the authentication response can be an AUTHR value.

The process 490 sends a first SIP message to a server, the SIP message including the authentication response. For example, the server can authenticate the mobile station based on the authentication response or forward the authentication response to another server that authenticates the mobile station. The first SIP message includes an SIP INVITE request, an SIP MESSAGE request, an SIP INFO request, or an SIP 18x response. The SIP message can have a multipurpose internet mail extensions (MIME) payload that includes the authentication response. The SIP message can have an SIP header that includes the authentication response.

The process 490 receives an SIP message from the server indicating that the mobile station has been authenticated.

Generic Computing Devices

Figure 12:
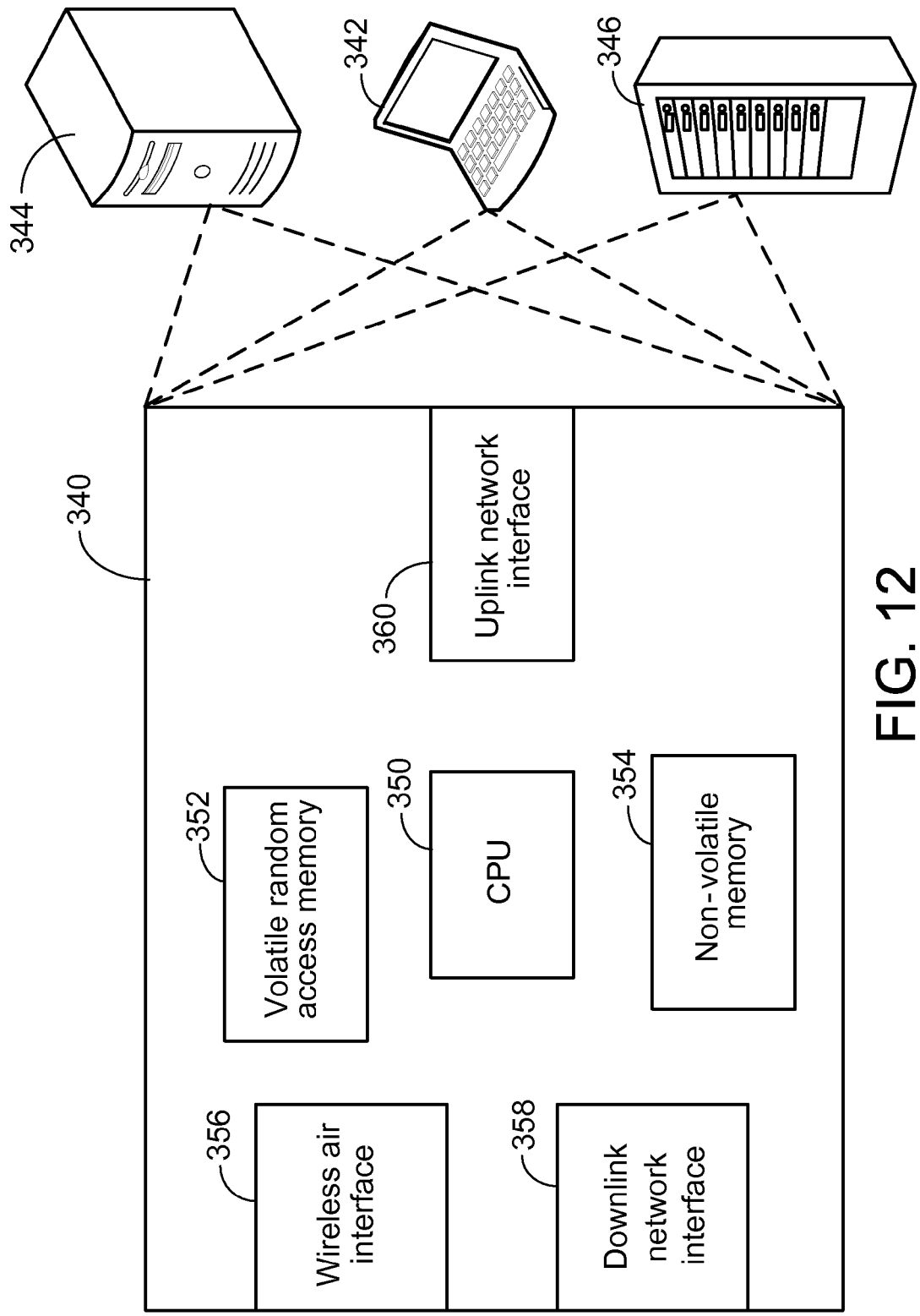
FIGS. 12 and 13 are schematic diagrams of computing devices.

FIG. 12 is a schematic diagram of an example of a computing device 240 that can be used to implement, e.g., the femtocell 104 and various components of the IMS network 122. The computing device 340 is intended to represent various forms of digital computers, such as laptops 342, desktops 344, rack server systems 346, workstations, servers, blade servers, mainframes, and other appropriate computers. The computing device 340 can be implemented by hardware or a combination of hardware and software. The components shown here, their connections and relationships, and their functions, are meant to be exemplary only, and are not meant to limit implementations of the inventions described and/or claimed in this document.

The computing device 340 includes a central processing unit (CPU) 350, a volatile random access memory 352, a non-volatile memory 354, a wireless air interface 356, a downlink network interface 358, and an uplink networking interface 360. Each of the components 350, 352, 354, 356, 358, and 360 are interconnected using various buses, and may be mounted on a common motherboard or in other manners as appropriate. The CPU 350 can process instructions for execution, including instructions stored in the volatile random access memory 352 or the non-volatile memory 354. In other implementations, multiple processors may be used, as appropriate, along with multiple memories and types of memory. Also, multiple computing devices 340 may be connected, with each device providing portions of the necessary operations (e.g., as a server bank, a group of blade servers, or a multi-processor system).

The non-volatile memory 354 stores software and configuration data, and can be, e.g., a hard disk drive, flash memory, or other types of non-volatile storage. The non-volatile memory 354 can be configured to read data and instructions from a removable storage medium, such as a magnetic tape or optical disc.

The CPU 350 can process instructions for execution within the computing device 340, including instructions stored in the random access memory 352 or on the non-volatile memory 354. A computer program product can be tangibly embodied in an information carrier. The computer program product may also contain instructions that, when executed, perform one or more methods, such as those described above. The information carrier is a computer- or machine-readable medium, such as the volatile random access memory 352, the non-volatile memory 354, memory on processor 350, or a propagated signal.

The computing device 340 can send (or receive) information to (or from) other devices through the uplink network interface 360, the downlink network interface 358, and the wireless air interface 356. The wireless air interface 356 includes, e.g., a radio frequency antenna, a radio module to send or receive radio signals, and a digital signal processor to process the radio signals. The radio module and the digital signal processor can be one integrated component or be built with discrete components.

Figure 13:
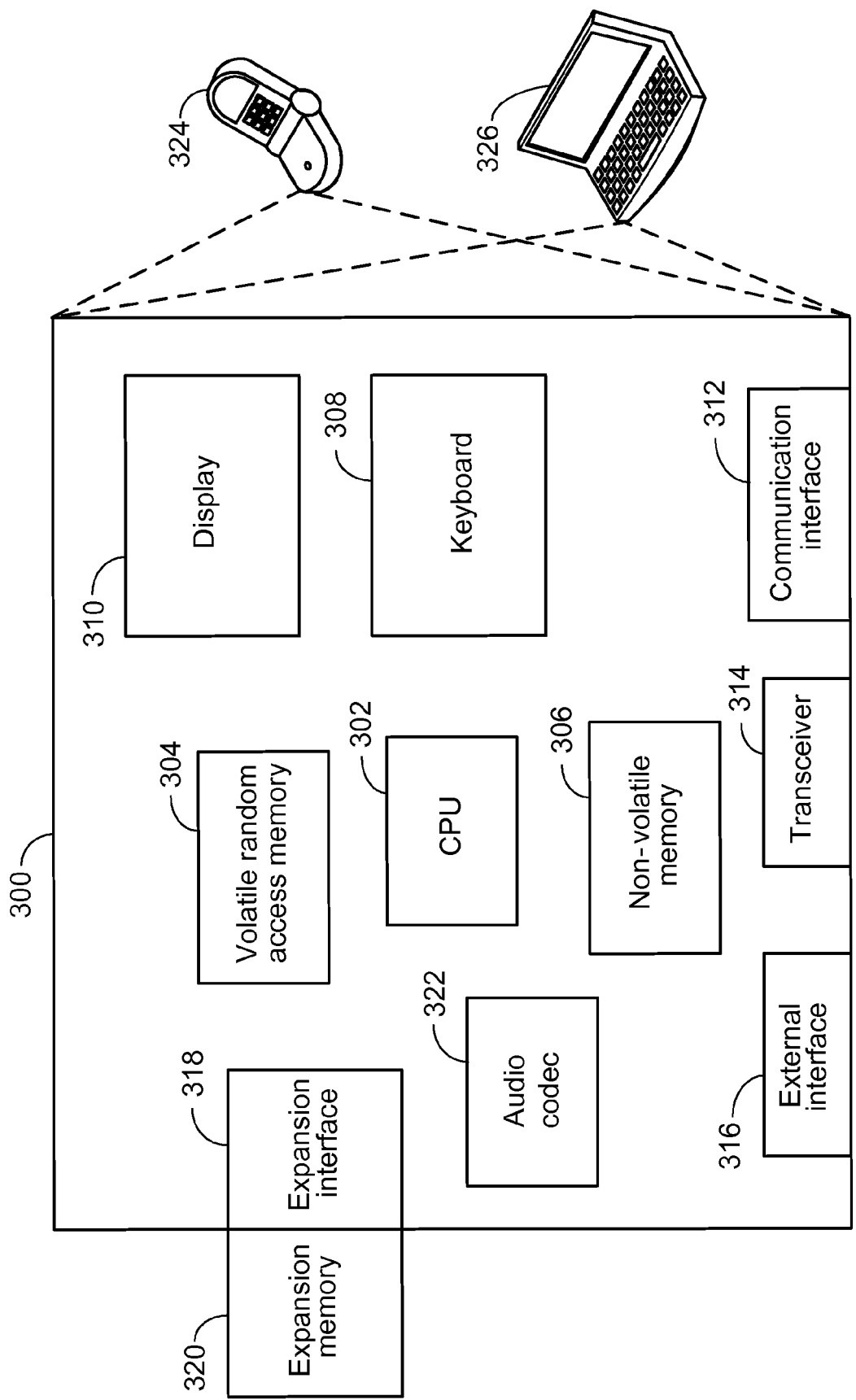

FIG. 13 is a schematic diagram of an example of a computing device 300 that can be used to implement a wireless mobile device 102. The computing device 300 can be, for example, a personal digital assistant, a cellular telephone, or a smartphone. The components shown here, their connections and relationships, and their functions, are meant to be exemplary only, and are not meant to limit implementations of the inventions claimed in this document.

The computing device 300 includes a central processing unit (CPU) 302, volatile random access memory 304, non-volatile memory 306, an input device such as a keyboard 308 (or keypad), an output device such as a display 310, a communication interface 312, a transceiver 314, an external interface 316, and an expansion interface 318, among other components. The computing device 300 may also be provided with a storage device, such as a microdrive or other device, to provide additional storage. Each of the components 302, 304, 306, 308, 310, 312, 314, 316, and 318, are interconnected using various buses, and several of the components may be mounted on a common motherboard or in other manners as appropriate.

The CPU 302 can execute instructions within the computing device 300, including instructions stored in the volatile random access memory 304 and non-volatile memory 306. The CPU 302 may be implemented as a chipset of chips that include separate and multiple analog and digital processors. The CPU 302 may provide, for example, coordination of the other components of the device 300, such as control of user interfaces, applications run by device 300, and wireless communication by device 300.

The keyboard 308 allows the user to enter commands, and the display 310 allows the device 300 to output information to the user. The display 310 may be, for example, a thin film transistor) liquid crystal display or an organic light emitting diode display, or other appropriate display technology. An external interface 316 may be provide to enable near area communication of the device 300 with other devices. The external interface 316 may provide, for example, for wired communication in some implementations, or for wireless communication in other implementations, and multiple interfaces may also be used.

The non-volatile memory 306 may include, for example, flash memory. Expansion memory 320 may also be provided and connected to the device 300 through the expansion interface 318, which may include, for example, a SIMM (Single In Line Memory Module) card interface. Such expansion memory 320 may provide extra storage space for the device 300, or may also store applications or other information for the device 300. The expansion memory 320 may include instructions to carry out or supplement the processes described above, and may include security information. For example, the expansion memory 320 may be provided as a security module for the device 300, and may be programmed with instructions that permit secure use of the device 300. In addition, security applications may be provided via the SIMM cards, along with additional information, such as placing identifying information on the SIMM card in a non-hackable manner.

In one implementation, a computer program product is tangibly embodied in an information carrier. The computer program product contains instructions that, when executed, perform one or more methods, such as those described above. The information carrier is a computer- or machine-readable medium, such as the volatile random access memory 304, non-volatile memory 306, expansion memory 320, memory on the CPU 302, or a propagated signal that may be received, for example, over transceiver 314 or external interface 316.

Device 300 may communicate wirelessly through communication interface 312, which may include digital signal processing circuitry where necessary. Communication interface 312 may provide for communications under various modes or protocols. Such communication may occur, for example, through radio-frequency transceiver 314. In addition, short-range communication may occur, such as using a Bluetooth, WiFi, or other such transceiver (not shown).

Device 300 may communicate audibly using an audio codec 322, which may receive spoken information from the user and convert it to usable digital information. The audio codec 322 may generate audible sound for the user, such as through a speaker, e.g., in a handset of device 300.

The computing device 300 may be implemented in a number of different forms, as shown in the figure. For example, it may be implemented as a cellular telephone 324, a part of a smart phone 326, personal digital assistant, or other similar mobile device.

Various implementations of the access gateway 102, access router 106, access terminal 104, and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, and may have input and/or output devices.

The computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

A number of embodiments of the invention have been described. Nevertheless, it will be understood that various modifications may be made without departing from the spirit and scope of the invention. For example, various forms of the message flow described above may be used, with steps re-ordered, added, or removed. The mobile station 102, the femtocell 104, and the IMS network 122 can comply with protocols and standards other than those described above. For example, the mobile station 102 can be a 3G circuit mode handset. The systems and processes described above can be applied to 3GPP2 IMS/MMD networks, 3GPP IMS networks connecting legacy handsets (e.g., UMTS or GSM handsets), and other SIP networks in general that are used to connect legacy mobile networks. Various components described above can be combined, each component can further include additional components.

Accordingly, other embodiments are within the scope of the following claims.

What is claimed is:

1. A method comprising:
   sending a challenge from a first device to a mobile station, the first device operating as a bridge between the mobile station and an IP multimedia subsystem (IMS) network that includes a home subscriber server, in which the IMS network is configured to use an authentication protocol to establish security associations with mobile stations, and the mobile station is not compatible with the authentication protocol used by the IMS network;
   at the first device, receiving a first authentication response from the mobile station through a wireless link, generating a secret key based on the first authentication response, and generating a second authentication response based on the secret key, in which the first authentication response is generated based on the challenge and an authentication key stored at the mobile station; and
   providing the second authentication response to the IMS network for authenticating the mobile station to enable the mobile station to access the IMS network, in which the second authentication response is generated by the first device based on the secret key that is generated by the first device based on the first authentication response provided by the mobile station.

2. The method of claim 1 wherein the network comprises at least one of 3GPP IP multimedia subsystem (IMS) network and 3GPP2 IMS network.

3. The method of claim 1 wherein the secret key comprises an AKA (authentication and key agreement) key.

4. The method of claim 1 wherein generating a secret key comprises generating the secret key based on the first authentication response and a random number.

5. The method of claim 1, comprising generating a cipher key (CK) and an integrity key (IK) from the secret key.

6. The method of claim 1 wherein generating the second authentication response comprises generating the second authentication response according to hypertext transfer protocol (HTTP) digest authentication using authentication and key agreement (AKA).

7. The method of claim 1 wherein the mobile station is compatible with an authentication process based on CAVE (cellular authentication and voice encryption) algorithm.

8. The method of claim 1 wherein the mobile station generates a signaling message encryption key (SMEKEY) and a private long code mask (PLCM) internally but does not transmit the SMEKEY and PLCM wirelessly.

9. The method of claim 1 wherein the mobile station is not compatible with an authentication process based on AKA (authentication and key agreement) protocol.

10. The method of claim 1 wherein sending a challenge from a first device to a mobile station comprises sending, from a femtocell, the challenge to the mobile station.

11. The method of claim 1 wherein the challenge is derived from a random challenge provided by the network.

12. The method of claim 1 wherein the network uses session initiation protocol (SIP) authentication.

13. The method of claim 1 wherein the mobile station comprises at least one of a 1xRTT, UMTS, and GSM mobile phone.

14. The method of claim 1 in which the IMS network uses authentication and key agreement (AKA) protocol to authenticate mobile stations, and the mobile station is not compatible with the authentication and key agreement protocol.

15. A method comprising:
   registering a femtocell with a network using a session initiation protocol (SIP) authentication process;
   sending a challenge from the femtocell to the mobile station;
   at the femtocell, receiving a first authentication response to the challenge wirelessly from the mobile station;
   at the femtocell, generating a secret key based on the first authentication response, and generating a second authentication response based on the secret key; and
   authenticating the mobile station by sending the second authentication response in an SIP message from the femtocell to a server, in which the server is capable of authenticating the mobile station based on the authentication response or forwards the authentication response to another server that is capable of authenticating the mobile station.

16. The method of claim 15, comprising assigning a femtocell identifier to the mobile station.

17. The method of claim 16, comprising associating the femtocell identifier with a mobile identifier of the mobile station.

18. The method of claim 15 wherein registering a femtocell with a network comprises registering the femtocell with an IP multimedia subsystem (IMS) network.

19. The method of claim 18 wherein registering the femtocell with the IMS network comprises authenticating the femtocell using one of a plurality of generic IMS credentials associated with the femtocell, and each of the generic IMS credentials can be used to authenticate an IMS/SIP session initiated from the femtocell.

20. The method of claim 15, comprising using at least one of a home subscriber server (HSS) and a home location register/authentication center (HLR/AC) to authenticate the mobile station.

21. The method of claim 15 wherein the mobile station sends the authentication response to the femtocell in a 1xRTT session.

22. The method of claim 21, comprising tying information sent from the mobile station in the 1xRTT session with an SIP session initiated by the femtocell during the SIP authentication process.

23. The method of claim 15, comprising connecting the femtocell to multiple mobile stations and assigning different femtocell identifiers to different mobile stations.

24. The method of claim 23, comprising associating the femtocell identifiers with corresponding mobile identifiers of the mobile stations.

25. The method of claim 24, comprising establishing communication links between multiple femtocells and an IMS network, each femtocell communicating with one or more mobile stations, and routing calls addressed to particular mobile stations identified by the mobile identifiers to corresponding femtocells using the femtocell identifiers associated with the mobile identifiers.

26. The method of claim 25 wherein the mobile identifiers comprise at least one of mobile identification numbers and mobile directory numbers.

27. A method of re-authenticating a mobile station, the method comprising:

after a mobile station has already registered with an IP multimedia subsystem (IMS) network, receiving, at a femtocell, a first authentication response wirelessly from the mobile station without re-registering the mobile station with the IMS network, in which the mobile station is not configured to send session initiation protocol (SIP) registration messages;

sending, from the femtocell, a first SIP message to a server, the first SIP message including a second authentication response that is derived from the first authentication response, in which the second authentication response is generated at the femtocell, and the server is capable of authenticating the mobile station based on the second authentication response or forwards the second authentication response to another server that is capable of authenticating the mobile station; and receiving a second SIP message from the server indicating that the mobile station has been authenticated.

28. The method of claim 27 wherein the first SIP message comprises at least one of an SIP INVITE request, an SIP MESSAGE request, an SIP INFO request, and an SIP 18x response.

29. The method of claim 27 wherein sending an SIP message comprises sending an SIP message having at least one of (a) a multipurpose internet mail extensions (MIME) payload that includes the authentication response and (b) an SIP header that includes the authentication response.

* * * * *